(12) United States Patent
Badawy et al.

(10) Patent No.: US 9,280,319 B2
(45) Date of Patent: Mar. 8, 2016

(54) INTEGRATED VISUALIZATION FOR MODELED CUSTOMIZATIONS

(71) Applicant: Microsoft Technology Licensing, LLC, Redmond, WA (US)

(72) Inventors: Robert Badawy, Redmond, WA (US); Khalid Aggag, Redmond, WA (US); Nitinkumar Shah, Seattle, WA (US); Suriya Narayanan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 3 days.

(21) Appl. No.: 14/058,077

(22) Filed: Oct. 18, 2013

(65) Prior Publication Data

US 2015/0113500 A1  Apr. 23, 2015

(51) Int. Cl.
*G06F 9/44* (2006.01)
*G06F 9/445* (2006.01)

(52) U.S. Cl.
CPC .. *G06F 8/20* (2013.01); *G06F 8/10* (2013.01); *G06F 8/65* (2013.01)

(58) Field of Classification Search
CPC .................. G06F 17/30563; G06F 17/30017; G06F 17/30076; G06F 17/30327; G06F 17/3092; G06F 8/20; G06F 8/10; G06F 8/65
See application file for complete search history.

(56) References Cited

U.S. PATENT DOCUMENTS

| | | | |
|---|---|---|---|
| 5,652,884 A | 7/1997 | Palevich | |
| 6,553,563 B2 | 4/2003 | Ambrose et al. | |
| 6,601,234 B1 | 7/2003 | Bowman-Amuah | |
| 7,076,762 B2 | 7/2006 | Fisher | |
| 7,080,089 B2 | 7/2006 | Plaisted et al. | |
| 7,451,432 B2 | 11/2008 | Shukla et al. | |
| 7,577,934 B2 | 8/2009 | Anonsen et al. | |
| 7,711,688 B2 | 5/2010 | Plaisted et al. | |
| 7,895,572 B2 | 2/2011 | Stienhans | |
| 7,941,542 B2 | 5/2011 | Broda et al. | |
| 7,945,596 B2 | 5/2011 | Anonsen et al. | |
| 8,132,147 B2 * | 3/2012 | Lochmann | G06F 8/10 717/106 |
| 8,181,150 B2 * | 5/2012 | Szpak | G06F 8/10 717/104 |
| 8,572,566 B2 | 10/2013 | Gass et al. | |
| 8,776,016 B2 * | 7/2014 | Sebastian | G06F 8/20 717/113 |
| 8,856,737 B2 | 10/2014 | Kand et al. | |
| 9,075,959 B2 * | 7/2015 | Chouinard | G06F 21/10 |
| 9,158,503 B2 * | 10/2015 | Misbhauddin | G06F 8/20 |
| 2002/0161777 A1 * | 10/2002 | Smialek | G06F 8/10 |

(Continued)

FOREIGN PATENT DOCUMENTS

KR    20140071292 A    6/2014

OTHER PUBLICATIONS

E. Burger, Flexible views for view-based model-driven development, 2013, 6 pages.*

(Continued)

*Primary Examiner* — Thuy Dao
(74) *Attorney, Agent, or Firm* — Thomas Marquis; Kate Drakos; Micky Minhas

(57) ABSTRACT

An integrated view is generated for a model element being customized. The integrated view shows an integrated visualization of the model element in the base system as well as a plurality of different extensions to the model element. The integrated view also facilitates editing of an extension document that represents a customization currently being made.

17 Claims, 23 Drawing Sheets

(56) References Cited

U.S. PATENT DOCUMENTS

| | | | |
|---|---|---|---|
| 2003/0149934 | A1 | 8/2003 | Worden |
| 2005/0102612 | A1 | 5/2005 | Allan et al. |
| 2005/0132276 | A1* | 6/2005 | Panditharadhya et al. ... 715/513 |
| 2006/0168557 | A1 | 7/2006 | Agrawal et al. |
| 2006/0241961 | A1 | 10/2006 | Tsyganskiy et al. |
| 2007/0100471 | A1* | 5/2007 | Kumar et al. .................. 700/18 |
| 2007/0157179 | A1 | 7/2007 | Seeger et al. |
| 2007/0288887 | A1 | 12/2007 | Pepin et al. |
| 2009/0064090 | A1* | 3/2009 | Anonsen et al. .............. 717/104 |
| 2009/0254801 | A1* | 10/2009 | Pressman .................. G06F 8/10 715/205 |
| 2010/0107136 | A1 | 4/2010 | Fildebrandt et al. |
| 2011/0209045 | A1 | 8/2011 | Ghosh et al. |

OTHER PUBLICATIONS

Kramer et al., View-centric engineering with synchronized heterogeneous models, Jul. 2013, 6 pages.*

Harmsen, Barry, "QlikView Extension tutorials, documentation and examples", Published on: Jul. 6, 2012, Available at: http://www.qlikfix.com/2012/07/03/qlikview-extension-tutorials-documentation-and-examples/.

International Search Report and Written Opinion for International Application No. PCT/US2014/060320, date of mailing: Jan. 20, 2015, date of filing: Oct. 14, 2014, 12 pages.

"Using Git Support in NetBeans IDE", Published on: Feb. 20, 2011 Available at: https://netbeans.org/kb/docs/ide/git.html#versioningView.

Zhdanov, Denis., "Arrange Your Code Automatically with IntelliJ IDEA 12", Published on: Oct. 1, 2012 Available at: http://blog.jetbrains.com/idea/2012/10/arrange-your-code-automatically-with-intellij-idea-12/#sthash.YN7jCzx6.dpuf.

"The Rational Team Concert Client for Microsoft Visual Studio IDE", Retrieved on: Feb. 24, 2015 Available at: https://jazz.net/products/rational-team-concert/features/vsclient.

Jana, Abhijit., "Color Indicator for Code Changes—Track Changes in Visual Studio 2010", Published on: Sep. 14, 2010 Available at: http://www.codeproject.com/Articles/109611/Color-Indicator-for-Code-Changes-Track-Changes-in.

"Building Customizable Oracle ADF Business Applications with Oracle Metadata Services (MDS)", An Oracle White Paper, Jun. 2010, 57 pages.

Application and Drawings for U.S. Appl. No. 14/753,241, filed Jun. 29, 2015, 83 pages.

* cited by examiner

FIG. 5

EXPENSE FORM

Date — 174
Amount — 176
Vendor — 178
Expense Category — 180
Description — 182

Project — 184
Monthly Expenses — 186
Week 1 | Week 2 | Week 3 | Week 4
Day 1 ... Day 7

Receipt Image — 188
Image Capture — 189

CANCEL ⊗ SUBMIT ⊖ SAVE — 190

INTEGRATED VISUALIZATION FOR MODELED CUSTOMIZATIONS

Computer systems are currently in wide use. Some computer systems are relatively large, and may include, for instance, thousands of different user interface and data entities, like tables and other artifacts. Such computer systems are often customized (some heavily customized) before they are deployed in a given implementation.

By way of example, some large computer systems include business systems. Such business systems may include, for instance, enterprise resource planning (ERP) systems, customer relations management (CRM) systems, line-of-business (LOB) systems, among others. These types of business systems often include many thousands of different forms, each of which have many different controls and other user interface elements. Such systems also commonly include a great deal of business logic, as well as workflows, and data entities (such as tables) that allow users to access the system and perform a set of activities, or tasks, in order to carry out their duties in conducting the particular business for which they are working.

Various types are modeled in a business system. The types are compiled (or assembled) into assemblies that are run during runtime. The modeled types can represent data or workflow. For instance, a business system may store information as a collection of entities, where each entity represents an item associated with the business. A customer entity, for example, may represent a customer. A sales order entity, for instance, may represent a sales order. A sales quote entity may represent a sales quote. These are illustrative examples only.

When such a business system is deployed in a specific business, it is common for the business system to be highly customized in order to meet the functional requirements of the particular business in which it is deployed. By way of example, different businesses may wish to have different fields on a given form that represents a customer entity. In addition, different organizations may wish to have different business logic for computing a currency conversion on an expense report form. Thus, it can be seen that a given business system may be heavily customized so that it meets the requirements of a given organization that is using it.

A business system may also have multiple different layers of customization. For instance, a software company that has created and developed the basic business system may simply sell the business system as a base product. An independent software vendor (ISV) may then generate a set of customizations to the base product, so that the base product can be resold with those customizations. A value added reseller (VAR) may add another layer of customizations, and the ultimate end user of the product may be in a partnership with a development partner, where the development partner adds their own customizations.

Currently, when a developer or other programmer generates customizations to a base product, the customizations are used to overwrite the base application models in the base product. Such overwriting is achieved by compiling the application model with the changes (to reflect the customizations) already made.

This type of customization can be problematic. For example, when the original software manufacturer attempts to publish an update to the base product, the update may, in some ways, be incompatible with the end user's customizations. Therefore, if the end user attempts to install the update, this can create problems. Further, even where the original software manufacturer is simply attempting to maintain the code base of the base product, this can also create problems where the maintenance conflicts with customizations that a given customer may have made.

Also, when a developer makes customizations to a business system, the development system generates some kind of view of the element being customized. This is commonly a view of only the added customizations (modifications made to the base element that is currently being customized). This can limit the developer's user experience and make customizing a business system more difficult and more time consuming The discussion above is merely provided for general background information and is not intended to be used as an aid in determining the scope of the claimed subject matter.

SUMMARY

An integrated view is generated for a model element being customized. The integrated view shows an integrated visualization of the model element in the base system as well as a plurality of different extensions to the model element. The integrated view also facilitates editing of an extension document that represents a customization currently being made.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5 and 6 are illustrative user interface displays.

FIGS. 6A-1 and 6A-2 (collectively 6A) is a flow diagram showing one illustrative embodiment of the operation of a visualization component.

DETAILED DESCRIPTION

Figure 1:
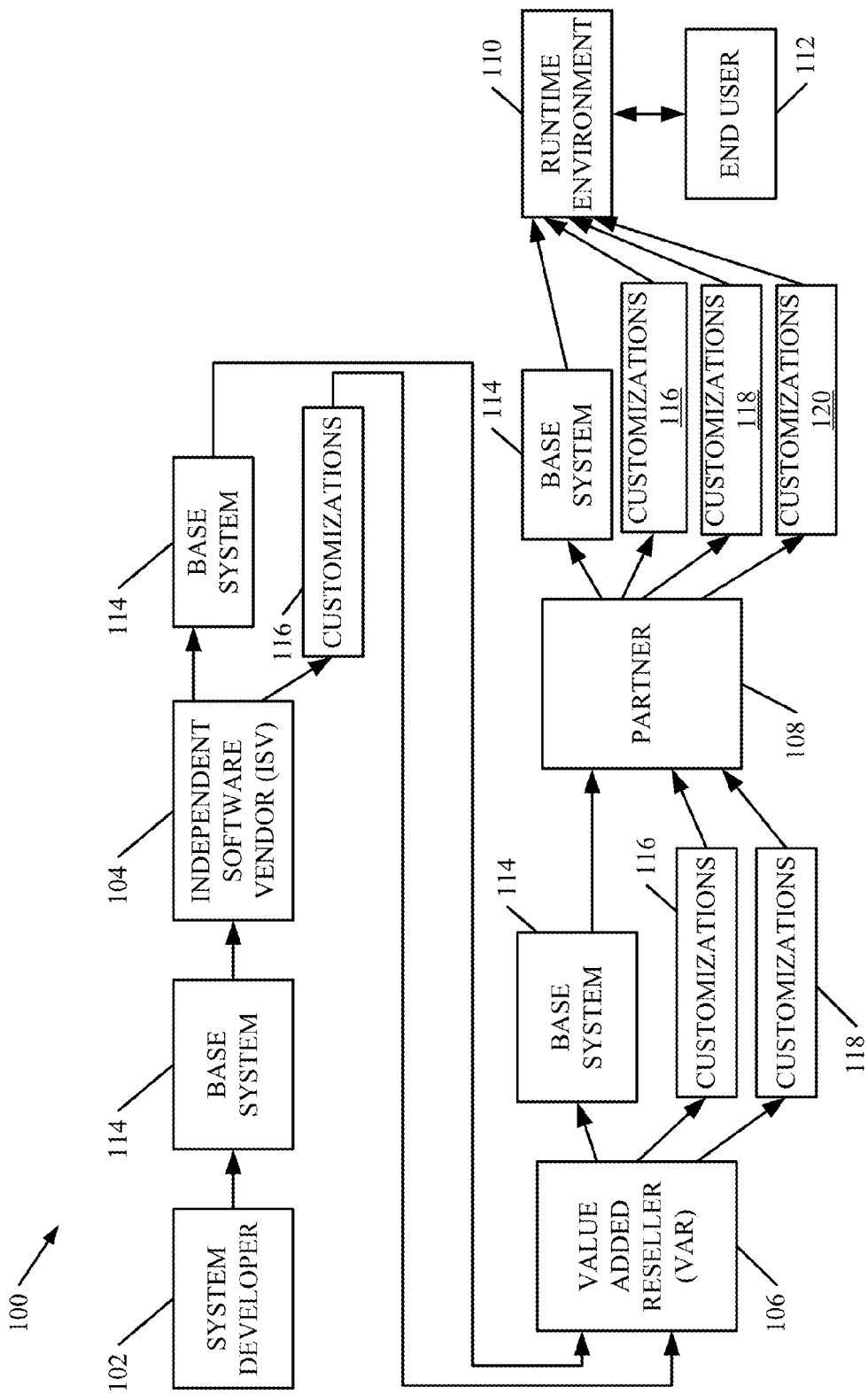
FIG. 1 is a block diagram of one illustrative development channel.

FIG. 1 is a block diagram of one illustrative development channel 100. Development channel 100 may illustratively include system developer 102, independent software vendor (ISV) 104, value added reseller (VAR) 106, partner 108, a runtime system 110 and end user 112. FIG. 1 shows that system developer 102 may illustratively be an original software manufacturer that designs and develops a base software system 114, such as a base business system. For instance, base system 114 may be an ERP system, a CRM system, an LOB system, etc.

Depending on the type of system, it may be that base system 114 is heavily customized or extended before it is deployed in runtime environment 110, for use by end users 112. By way of example, where base system 114 is a business system, independent software vendors 102 often customize base system 114 and make it available to value added resellers 106 which, themselves, customize the base system 114 (after it has already been customized by independent software vendor 104). It may also be that end user 112 is an organization that partners with partner 108 to even further customize the base system 114, to meet the functional requirements of the organization, so that it can be successfully deployed in runtime environment 110. As discussed in the background portion, this can present a number of problems.

Therefore, in development channel 100, any of the various developers (such as ISV 104, VAR 106, or partner 108) that customizes the base system 114, generates the customizations separately, without changing the models in base system 114. For instance, ISV 104 may generate a set of customizations 116, which are stored and maintained separately from base system 104. VAR 106 may, itself, generate a set of customizations 118, which are not only stored separately from base system 114, but which are also stored and maintained separately from customizations 116 that were made by ISV 104. Partner 108 may also make its own customizations 120, which are stored separately as well.

Then, when the base system 114 and customizations 116, 118 and 120 are deployed in runtime environment 110 for end user 112, the base system 114 and customizations 116, 118 and 120 are all compiled (or assembled) into different and isolated assemblies. The compiler (or assembler) can emit code indicating that the assemblies generated for the customizations 116, 118 and 120 are related to certain assemblies in the base system 114. Or, the assemblies for the customizations can be specifically marked to indicate which parts of base system 114 they customize, or they can be stored in specific locations to indicate that they are customization assemblies. In any case, the runtime server discovers all of the customizations 116, 118 and 120. The customization assemblies are run along with the assemblies for the base system to apply the customizations to base system 114 during runtime, without ever changing any of the models or assemblies in base system 114 (i.e., they are unaltered). In this way, system developer 102 can easily update base system 114, and maintain it. The updates and maintenance can be performed without ever generating conflicts with any of the customizations 116, 118 and 120. Also, the customizations 116, 118 and 120 can be separately maintained as well.

Figure 2:
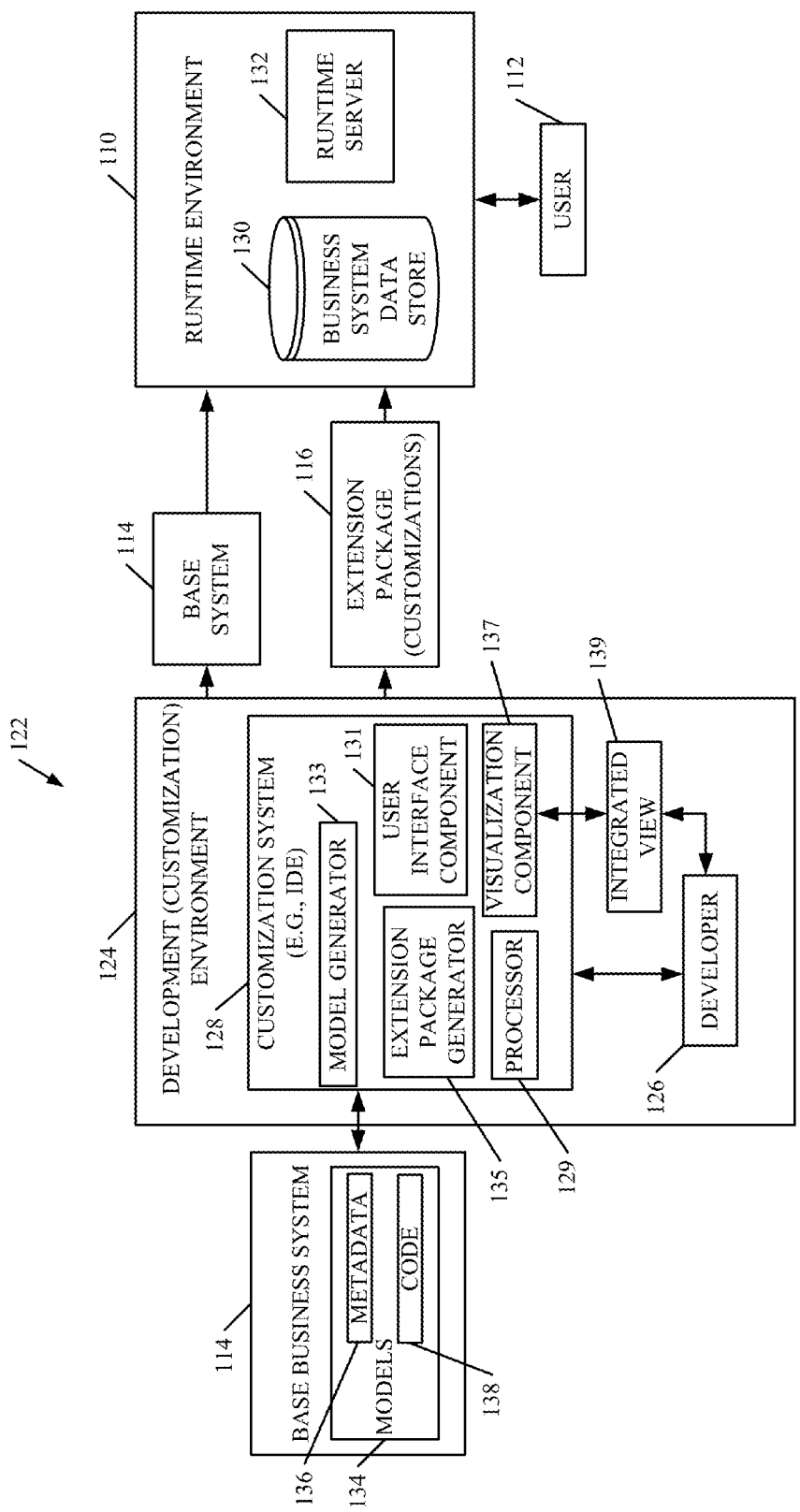
FIG. 2 is a block diagram of one illustrative business system architecture.

FIG. 2 is block diagram of one embodiment of a business system development architecture 122. Some of the items shown in FIG. 2 are similar to those shown in FIG. 1, and are similarly numbered. Architecture 122 illustratively represents any portion of the development channel 100 shown in FIG. 1. FIG. 2 also shows that, in one embodiment, base system 114 includes models 134. The models 134 illustratively have corresponding metadata 136 and can have code 138 as well.

By way of example, business system development architecture 122 illustratively includes a development environment 124 in which one or more developers 126 use a development and customization system (such as an integrated development environment) 128 to make customizations to the base business system 114. In the embodiment shown in FIG. 2, the development (or customization) environment 124 illustratively corresponds to the environment in which ISV 104 makes customizations 116 to base system 114. It will be noted, however, that development environment 124 can be an environment in which any developer in development channel 100 (shown in FIG. 1), or any other developer in any other channel, makes customizations to a base computer system.

For purposes of the present discussion, customizations will be used to mean additive changes or extensions to the underlying metadata or functionality of base system 114. By way of example only, a customization may be a change to metadata to increase the length of a field on a form. As another example, the customizations can be to add business logic, corresponding to a form, to change a calculation performed on data entered on the form. Of course, these are only examples of how customizations can be made to metadata or code, and a wide variety of other customizations can be made as well.

Figure 3:
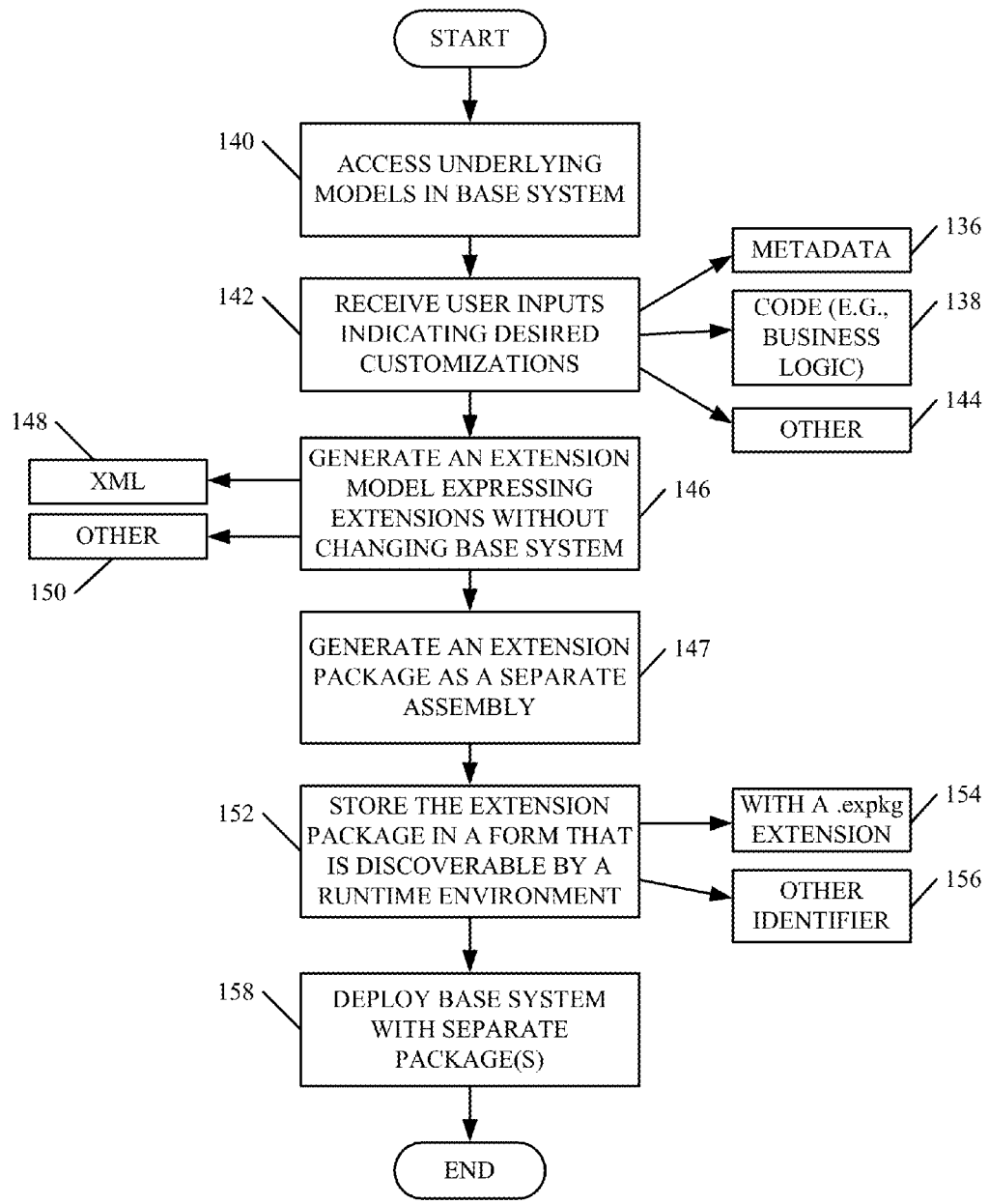
FIG. 3 is a flow diagram illustrating the operation of the architecture shown in FIG. 2 during customization.

In any case, FIG. 2 shows that runtime environment 110 illustratively includes a processor 129, business system data store 130, user interface component 131, runtime server 132, model generator 133, extension package generator 135 and visualization component 137. FIG. 3 is a flow diagram illustrating one embodiment of the operation of business system development architecture 122, shown in FIG. 2, in allowing developer 126 to use customization system 128 to make customizations to base system 114.

FIG. 3 shows that developer 126 can first access the underlying models 134 in base system 114. This is indicated by block 140 in FIG. 3. User interface component 131 in customization system 128 illustratively generates user interface displays that developer 126 can interact with, in order to visualize, control and manipulate customization system 128. Thus, customization system 128 receives, through the user interface displays, inputs from developer 126 indicating desired customizations that are to be made to base system 114. This is indicated by block 142 in FIG. 3. By way of example, the customizations can be extensions to metadata 136. They can also be extensions to code 138 (such as adding business logic, etc.). The customizations can be to other items 144 as well. While the developer is making the customizations, visualization component 137 is illustratively generating integrated visualizations (or views) 139 of the model element being customized. This is described in greater detail below with respect to FIGS. 6A-6F. Suffice it to say, for now, that the customizations are made.

Based upon the customization inputs received, model generator 133 in customization system 128 generates an extension model that models (or expresses) the extensions (i.e., the customizations), without changing the models in base system 114. This is indicated by block 146 in FIG. 3. The extension model can be generated in a wide variety of different ways. For instance, the extension model can express the extensions in extensible markup language (XML) or any variant of XML 148. It can also be expressed in other ways 150 as well.

Extension package generator 135 then generates an extension package from the extension model. This is indicated by block 147 in FIG. 3. In one embodiment, the extension package is a compiled (or assembled) form of the extension model, and it is generated as a separate assembly that is separate from (or isolated from) the assemblies generated for the base models 134 in base system 114.

Customization system 128 then stores the extension packages (shown as extension packages or customizations 116 in FIG. 2) in a form that is readily discoverable by runtime server 132 in runtime environment 110. This is indicated by block 152 in FIG. 3. In one embodiment, the assembler in extension package generator 135 emits code that identifies the extension package as being an assembly that extends a base assembly. In another embodiment, the metadata 136 corresponding to a model 134 that has been extended, has an addition placed therein indicating that an extension package exists for this particular model 134, without overwriting any of the original metadata 136. In another embodiment, the extension package 116 is stored with a certain file extension (such as .expkg or any other suitable file extension) to indicate that it is an extension package that is to be considered by runtime server 132 when a given model 134 is accessed. This is indicated by block 154 in FIG. 3. The extension package (or customizations) 116, can be identified in other ways as well, and this is indicated by block 156.

At some point, the base system 114, along with the separate extension packages (or customizations) 116, are deployed to runtime environment 110. Deploying the base system with the extension packages is indicated by block 158 in FIG. 3.

Figure 4:
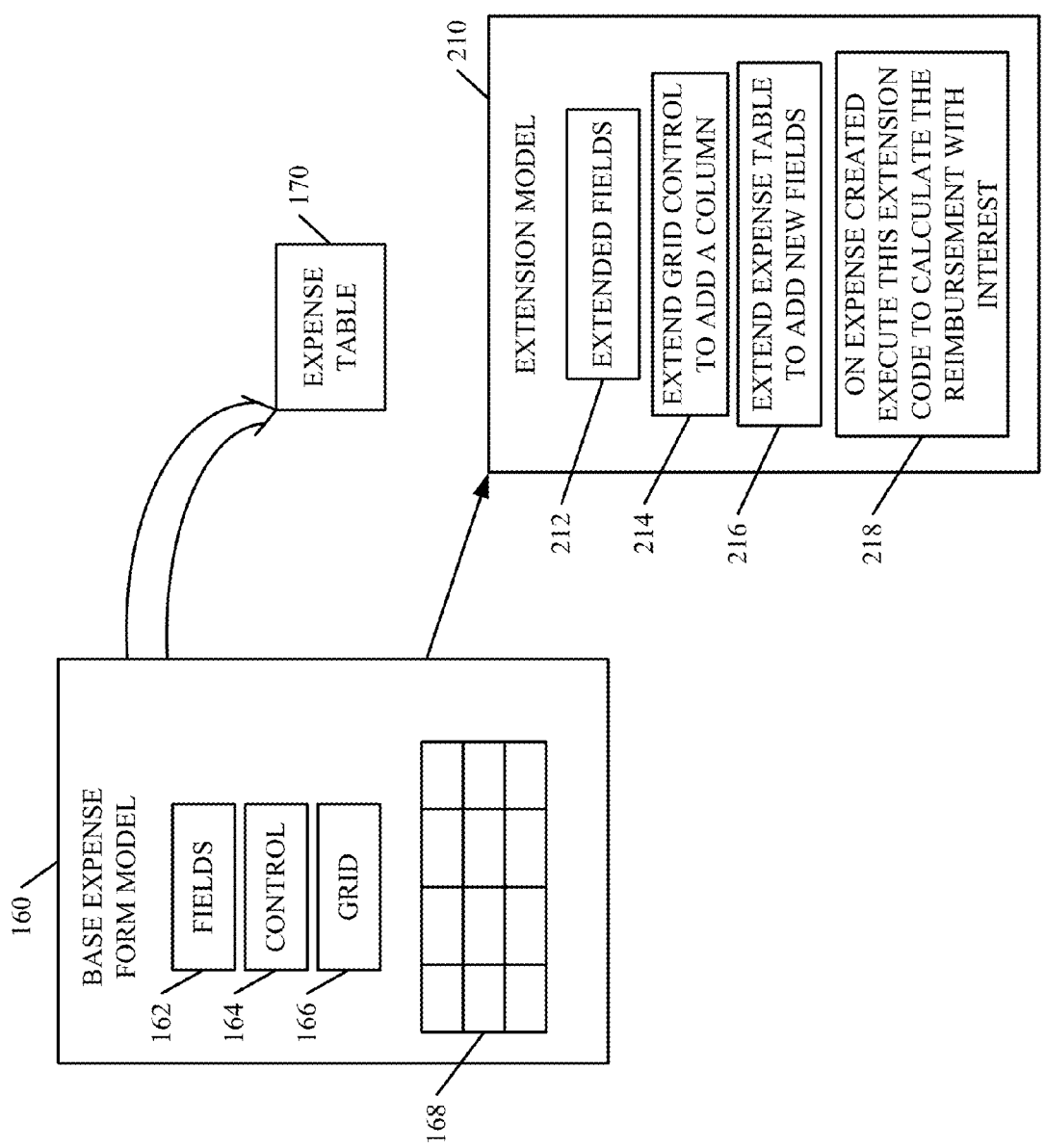
FIG. 4 is a block diagram illustrating one embodiment of extensions to a model.
Figure 6:
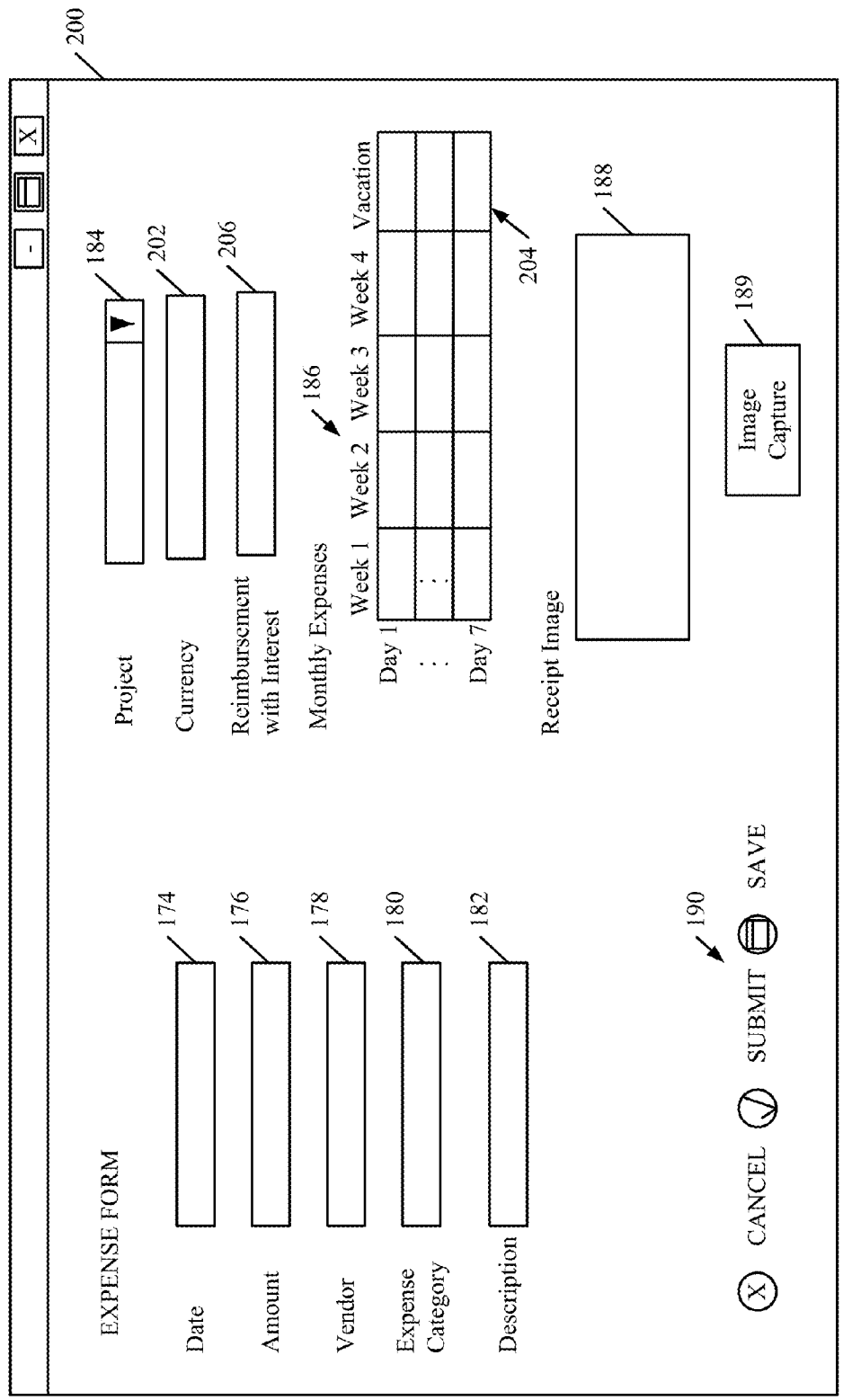

An example may be helpful. FIG. 4 is one block diagram of showing how a particular base model can be extended. FIGS. 5 and 6 are two corresponding user interface displays that indicate this as well. FIGS. 4-6 will now be described in conjunction with one another.

FIG. 4 shows that one model in base system 114 may be a base expense form model 160 that is used to model an expense form that can be pulled up by a user of the business system in order to enter an expense item, or generate an expense report. FIG. 4 shows that the base expense form model includes fields 162, general controls 164, a specific grid control 166, also graphically represented by grid 168 in FIG. 4. Each of the items 162-168 in model 160 is bound to a data source. In the example shown in FIG. 4, they are bound to an expense table 170 which provides data for the items 162-168.

FIG. 5 shows one embodiment of a user interface display of a form 172 that can be generated from base expense form 160. It can be seen that the fields illustratively include a date field 174, an amount field 176, a vendor field 178, an expense category field 180, and a description field 182. Form 172 also includes a project drop down menu control 184. Further, FIG. 5 also shows that form 172 includes a monthly expenses grid 186 that asks the user to enter expenses, as they have occurred, over the current month. In addition, form 172 includes a receipt image display 188 and an image capture control 189 that allows the user to capture an image of a receipt, for the given expense. For instance, when the user actuates control 189, the user is illustratively navigated to a series of user interface camera functionality that allows the user to capture an image of a receipt, and associate it with the expense form represented by user interface display 172.

FIG. 5 also shows that form 172 includes a set of general controls 190 that allow the user to cancel the expense item, to submit the expense form for approval, and to save the expense form.

Assume now that a developer wishes to customize the base expense form model 160 to add a column to grid control 186, and to add a plurality of fields to form 172, and to add business logic. For instance, assume that the developer wishes to add a column to grid 186 to allow the user indicate when they are on vacation. Assume also that the developer wishes to add a currency field to form 172 so that the user can identify the particular currency in which the expense was made. Assume also that the developer wishes add a display that shows the reimbursement amount that will be made to the user, after interest is applied.

FIG. 6, for example, shows another illustrative user interface display 200. User interface display 200 is similar, in some respects, to user interface display 172 shown in FIG. 5, and similar items are similarly numbered. However, FIG. 6 shows a user interface display that reflects a new expense form, that includes the additional fields, controls, and has corresponding business logic, which a developer wishes to add to the base expense form shown in FIG. 5.

FIG. 6, for instance, shows that the developer wishes to add currency field 202 so that the user, when inputting an expense item on an expense form, can indicate the particular currency which was used to make the payment. In addition, user interface display 200 shows that grid 186 now includes a vacation column 204. By way of example, it may be that the organization wishes to know of any business-related expenses that a user made while on vacation. FIG. 6 also shows that the expense form now includes a reimbursement field 206. A new set of business logic is also used to extend the form represented by user interface display 200. For instance, it may be that the organization wishes to repay its employees for business expenses, but also wishes to include interest with that reimbursement. Therefore, a piece of underlying business logic corresponds to the "reimbursement with interest" field 206 so that, when an expense item is created, and the amount and date are entered, the reimbursement with interest is calculated and displayed in field 206. Of course, this is exemplary only and other business logic could be added as well.

Referring again to FIG. 4, the block diagram of FIG. 4 shows an extension model 210 which can be generated by the developer in order to extend the base expense form model 160 to obtain the additional expenses and customizations discussed above with respect to FIG. 6. Developer 126 thus interacts with development and customization system 128 in order to extend the base expense form model 160 so that the form generated on the user interface display is that shown in FIG. 6. Thus, base expense form model 160 is extended to add certain fields and controls. In addition, the expense table 170 is extended to add rows and/or columns that hold data for the extensions to the fields and controls. Further, the business logic that is bound to the extension model 210 includes business logic that is used to calculate the reimbursement with interest. Developer 126 uses model generator 133 in customization system 128 to specifically model the extended fields 212. In the example being discussed, the extended fields include the currency field 202. In addition, developer 126 generates extension model 210 so that it models the extended grid control to add vacation column 204. This is indicated by item 214 in model 210. Developer 126 also uses model generator 133 to add an extension to expense table 170 so that the new data, for the new fields on the extended expense form model, are included in the expense table and are bound to the new fields. This is indicated at block 216 in FIG. 4. In addition, the extension model 210 includes the extended business logic code for calculating the reimbursement with interest that is displayed in field 206. It also illustratively includes the trigger that indicates when that code is to fire. For example, when an expense item is created, the developer 126 may wish for the reimbursement amount with interest to be calculated and displayed. The extension of that business logic code is indicated by block 218 in FIG. 4.

It will be noted that the extensions in extension model 210 are expressed in different ways. For instance, in one embodiment, they are expressed in XML, (or in a variant of XML), and in business logic code. In another embodiment, they are expressed in other ways. The extension model 210 is stored as a separate extension model, that is separate from the base expense form model 160. It is illustratively assembled into an extension package that is a separate assembly from the assemblies for the base models so that it can be discovered by a runtime server, during runtime, and used in the runtime implementation of the business system, without overwriting or altering the base system.

Figures 1, 6A:
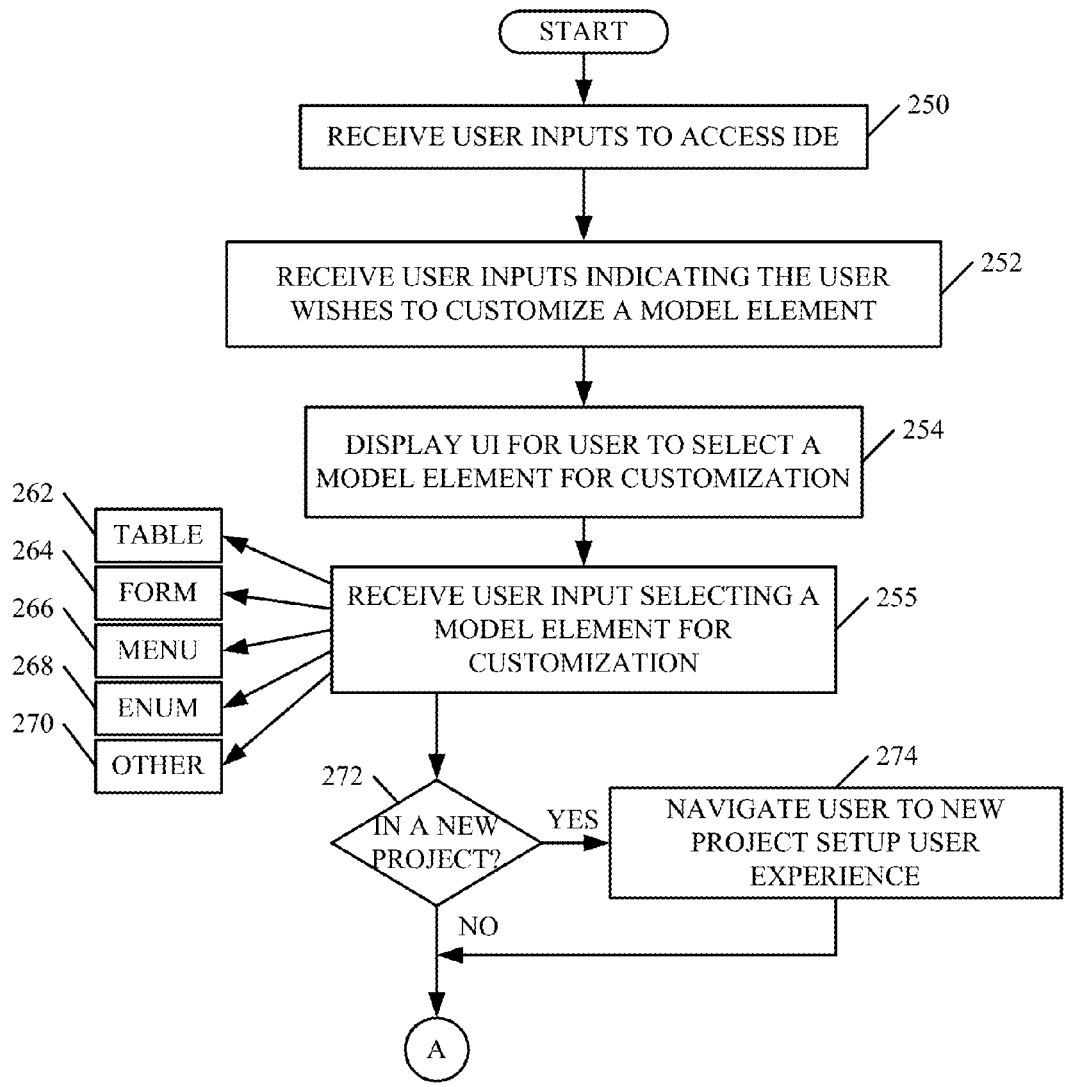
Figures 2, 6A:
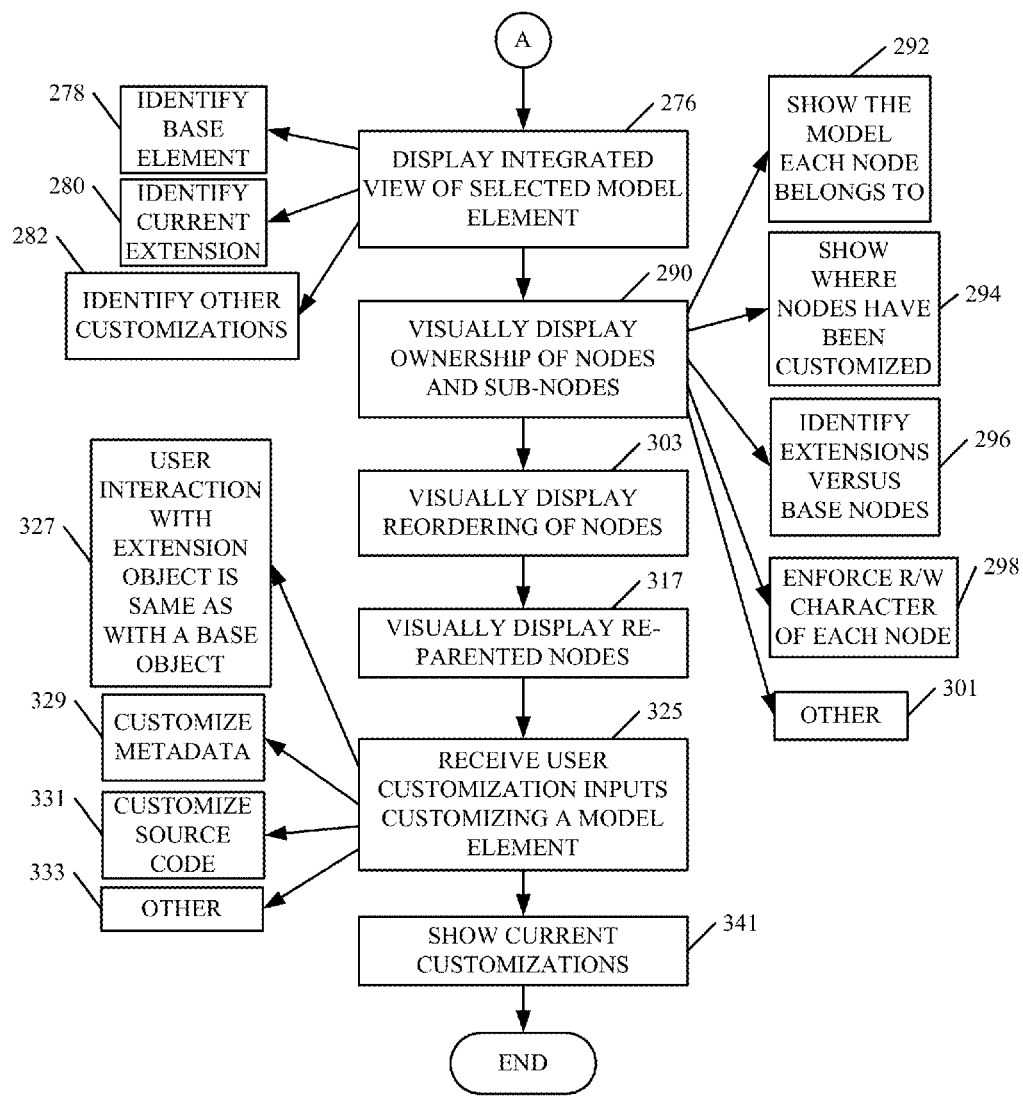

During and after making customizations, visualization component 137 generates an integrated view 139 of a model element being customized FIGS. 6A-1 and 6A-2 (collectively 6A) shows a flow diagram illustrating one embodiment of the operation of visualization component 137 in generating such a visualization, and FIGS. 6B-6F show exemplary user interface displays. FIGS. 6A-6F will now be described in conjunction with one another.

The developer (or user) 126 first provides inputs to development and customization system 128 indicating that developer 126 wishes to access development and customization system 128 in development environment 124. This is indicated by block 250 in FIG. 6A. By way of example, developer 126 may provide authentication information (such as a user name and password) to access a given project within customization system 128 or to start a new project. In response, user interface component 131 illustratively generates user interface displays for developer 126 so that developer 126 can select a particular model element that developer 126 wishes to customize. Receiving a user input from developer 126 indicating (or identifying) that the user wishes to customize a model element is indicated by block 252 in FIG. 6A.

After the user has provided inputs at block 252, visualization component 137 illustratively displays a user interface display for the user to select a model element for customization. This is indicated by block 254 in FIG. 6A. Visualization component 137 then receives, through the displayed user interface display, a user input selecting a model element for customization. This is indicated by block 255. The particular model element that can be selected for customization can be any modeled type. For instance, it can be table 262, form 264, menu 266, enumerations (enum) 268, or another modeled element 270.

Figure 6B:
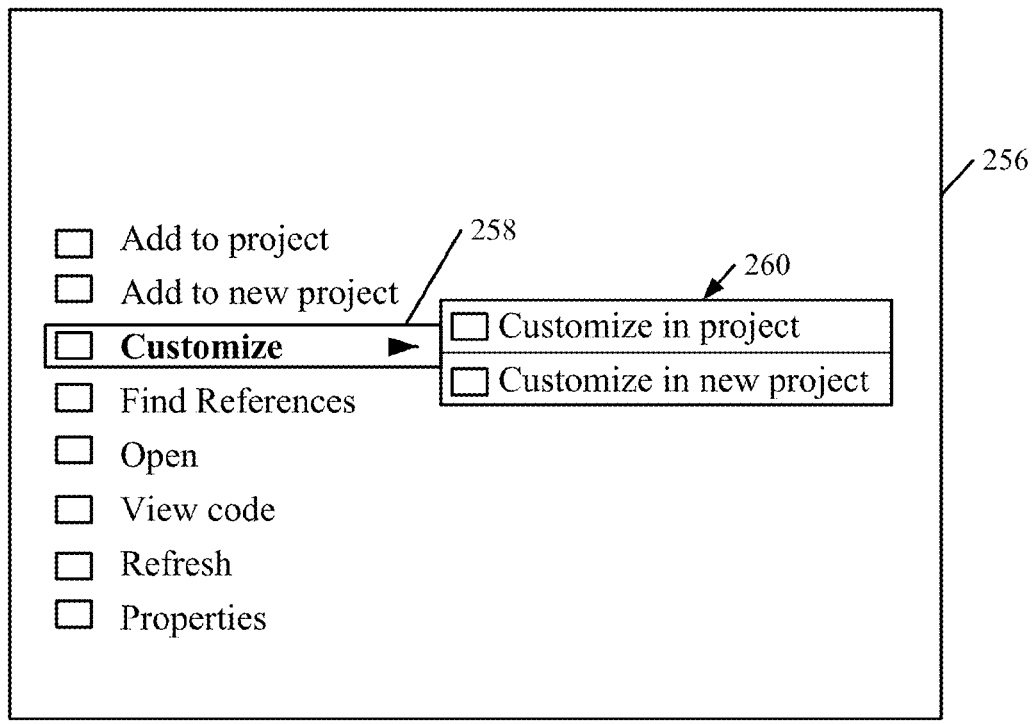
FIGS. 6B-6F show displays of exemplary visualizations.

FIG. 6B shows one embodiment of a portion of a user interface display 256 that receives user inputs from developer 126 indicating that the developer wishes to customize a given model element. By way of example, the various model elements in a model being customized can be displayed, and the user can simply select a given model element (such as by right clicking on it, or otherwise) and the user interface display 256 will be generated. If the user right clicks on a table, for instance, user interface display 256 is generated. It can be seen that the user has selected the "customize" user input mechanism 258 in the context menu of display 256. This allows the user to customize the selected table either in an existing project or in a new project, by actuating one of user input mechanisms 260.

If the user elects to customize the selected element in a new project, then the user is illustratively navigated to a new project setup user experience where customization system 128 generates a plurality of user interface displays that allow the user to set up a new project, and customize the selected model element within that new project. This is indicated by blocks 272 and 274 in the flow diagram of FIG. 6A.

If the user elects to customize the selected model element either in an existing project, or in a new project, visualization component 137 illustratively generates and displays an integrated view 139 of the selected model element. This is indicated by block 276 in FIG. 6A. It should be noted that the user can select a base model element that is modeled in base system 114, or an extension model that shows previous customizations to a base model. Visualization component 137 generates the integrated view 139 of the selected model element to reflect not only the base element, but all of its customizations as well. Identifying the base element in the integrated view is indicated by block 278. Identifying a current extension model (that can be edited to make current customizations) is indicated by block 280, and identifying other customizations in other extension models is indicated by block 282.

Figure 6C:
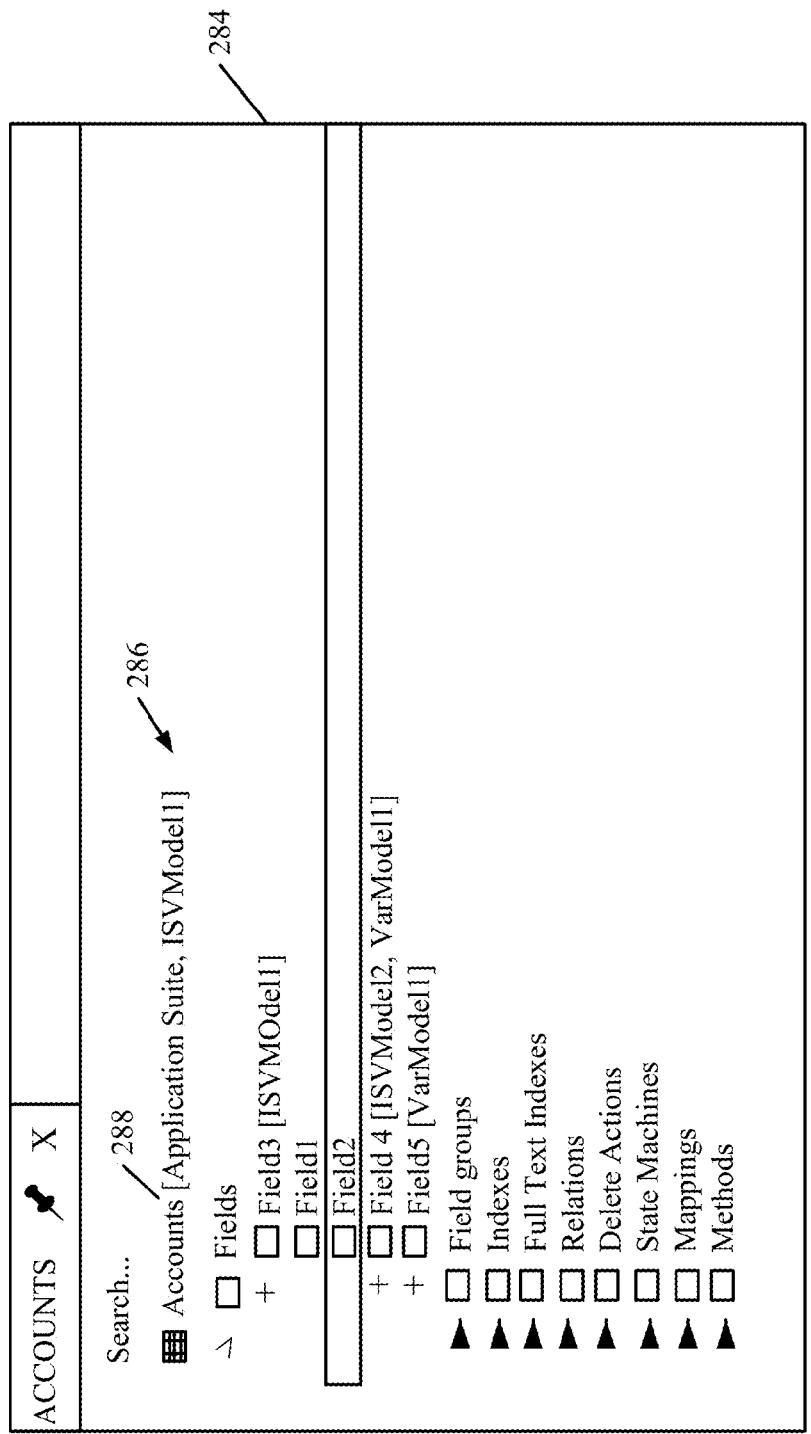

FIG. 6C shows one embodiment of a user interface display 284 that illustrates one exemplary integrated visualization (or integrated view). In the embodiment shown in FIG. 6C, developer 126 has illustratively selected the "accounts" table in an extension model (in the ISVModel1 model) that shows customizations of the baseline "accounts" table defined in an application suite baseline model. In the embodiment shown in FIG. 6C, the integrated visualization 284 is illustratively a hierarchical tree structure 286, that has parent nodes and child nodes. Child nodes are shown as being indented to the right relative to their parent nodes. A top level node 288 identifies the selected table (the "accounts" table), the base model where it is defined ("the application suite" model) and the current extension model (the ISVModel1). The models are illustratively listed in ascending layer order of increasing customizations, starting with the layer for the baseline model. Therefore, the ISVModel1 model is in a layer than the application suite model. In an alternative, the top level node 288 can identify the base model and the models of all related extension objects as well.

In one embodiment, visualization component 137 generates the integrated view to also visually display the ownership of nodes and subnodes. This is indicated by block 290 in the flow diagram of FIG. 6A. That is, the integrated view displays the model that each node belongs to. This is indicated by block 292. It can show where nodes have been customized as indicated by block 294. It can identify extension versus base nodes as indicated by block 296. It can enforce the read/write characteristic of each node as indicated by block 298, and it can display the ownership in other ways as well as indicated by block 301.

By way of example, display 284 in FIG. 6C shows that all nodes of the selected model element that do not belong to the base model, or that have been customized in other models, have visual indicators that indicate the models that they belong to. Further, there is a visual indicator of all nodes that belong to the current extension model being edited (ISVModel1). These visual indicators can be bold, or they can have the designation "ISVModel1" appended thereto, as examples. When the developer expands a collection node, subnodes that belong to the current extension model (ISVModel1) can be shown first, followed by subnodes that belong to the base model, followed by subnodes that belong to other extensions.

As an example, user interface display 284 shows that the "accounts" table has been customized in three different models. The "Field 3" node has been customized in (i.e., belongs to) the current ISVModel1. The "Field 4" node has been customized in both ISVModel2 and VARModel1. The "Field 5" model has been customized in VARModel1. The visual indicator "+" on the left of a node indicates that the corresponding node is an extension that is modeled in an extension model, and does not belong to the base model. For example, Fields 3, 4 and 5 are extensions and only Fields 1 and 2 belong to the base "accounts" model defined in the "application suite". In one embodiment, the only customization that is editable is the customization that is currently open. Customizations belonging to higher layer models, or lower layer models, or other same layer models will not be editable. In another embodiment, customizations that belong to higher layer models are read only in a current model. By way of example, the Field 4 and Field 5 nodes in the hierarchical structure 286 can be designated as read only, because they belong to higher layer models in the overall model hierarchy (such as the development channel shown in FIG. 1). This can be shown by displaying those nodes in italic font or in any other font-based indicator or other visual indicator.

The visualization in FIG. 6C can be changed as well. For instance, models that belong to (or are modified in) the current document (like the Field 3 node) are shown in bold but do not show the model name. Nodes that belong to other documents (the read only nodes) are shown in italics.

Figure 6D:
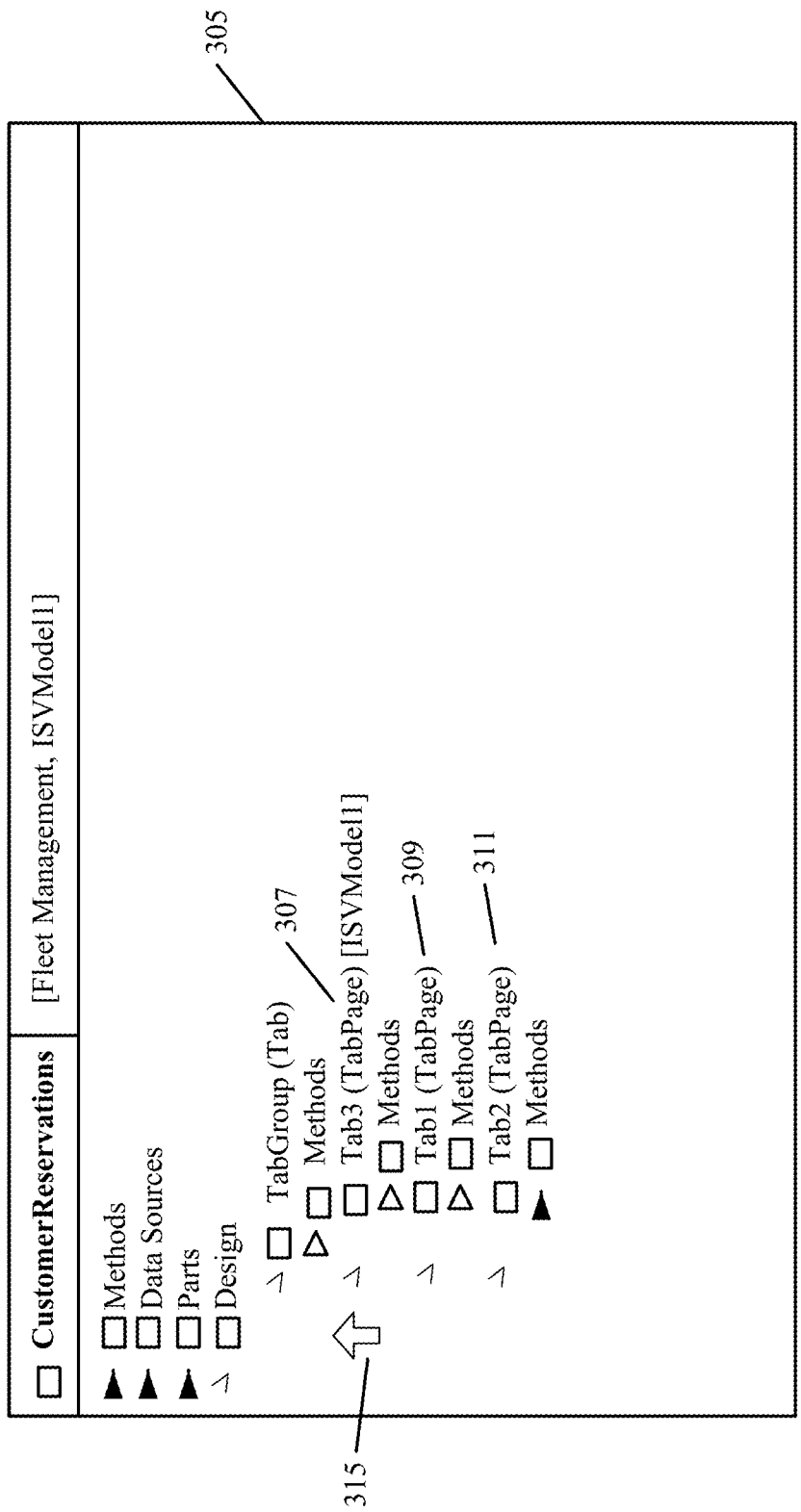

In one embodiment, visualization component 137 also generates the integrated view 139 to visually display that the customizations reflect reordering of nodes. This is indicated by block 303 in the flow diagram of FIG. 6A. FIG. 6D, for instance, shows a display 305 of one embodiment of an integrated view in which the user has selected the "customer reservations" table in the ISVModel1 model for customization. The developer 126 has then customized that table to move "tab 3" to be the first tab in the tab group. Thus, the integrated view shown in display 305 shows that the tab 3 node 307 has been reordered (moved upwardly) with respect to the tab 1 and tab 2 nodes 309 and 311. In addition, the tab 3 node 307 has a visual indicator 315 that indicates that tab 3 has been reordered in the upward direction. In the embodiment shown in FIG. 6D, visual indicator 315 is an arrow directed upwardly. Other visual indicators can be used as well, however.

Figure 6E:
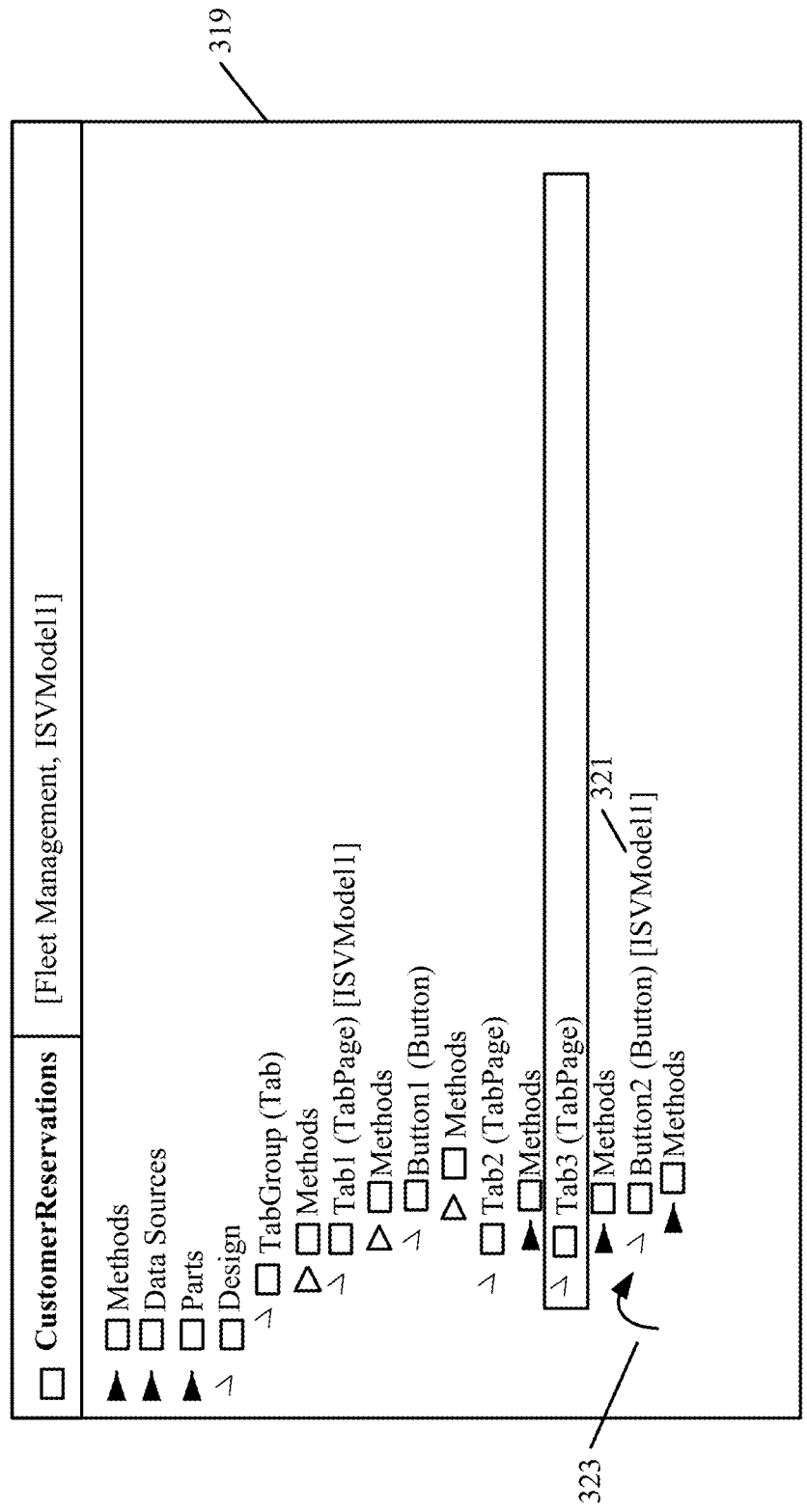

Also, in one embodiment, visualization component 137 generates the integrated view 139 to visually display re-parented nodes. FIG. 6E, for instance, shows one user interface display 319 of an integrated view where the user has selected the "customer reservations form" base element (which belongs to the "fleet management" model). Developer 126 has customized it in the ISVModel1 extension model by moving the button 2 node 321 from depending on tab 1 to depending on tab 3 (that is, the button 2 node 321 previously had tab 1 as its parent, and it now has tab 3 as its parent). The integrated view shown in display 319 also includes a visual indicator 323 that indicates that the button 2 node 321 has been re-parented. Other visual indicators can be used as well.

The integrated views described above show that, once the integrated view 139 has been generated for the selected model element, visualization component 137 illustratively allows developer 126 to visualize not only the document (i.e., the extension model) being customized (such as ISVModel1), but also information for closely related documents (such as the information for the document reflecting the base model and all other extension models that model customizations to the base model). While these are generated in a visualization that shows an integrated view, visualization component 137 illustratively generates the integrated view 139 so that developer 126 can only edit the current document that represents the ISVModel1 extension model. Developer 126 can thus provide user customization inputs customizing the model element in the current extension model. Receiving the user customization inputs is indicated by block 325 in the flow diagram of FIG. 6A.

In one embodiment the user interaction with the current extension model is the same as it would be in customizing a base model. This is indicated by block 327. Therefore, the developer can customize metadata as indicated by block 329, the developer can customize source code as indicated by block 331, or the developer can perform other customizations 333 as well.

Figure 6F:
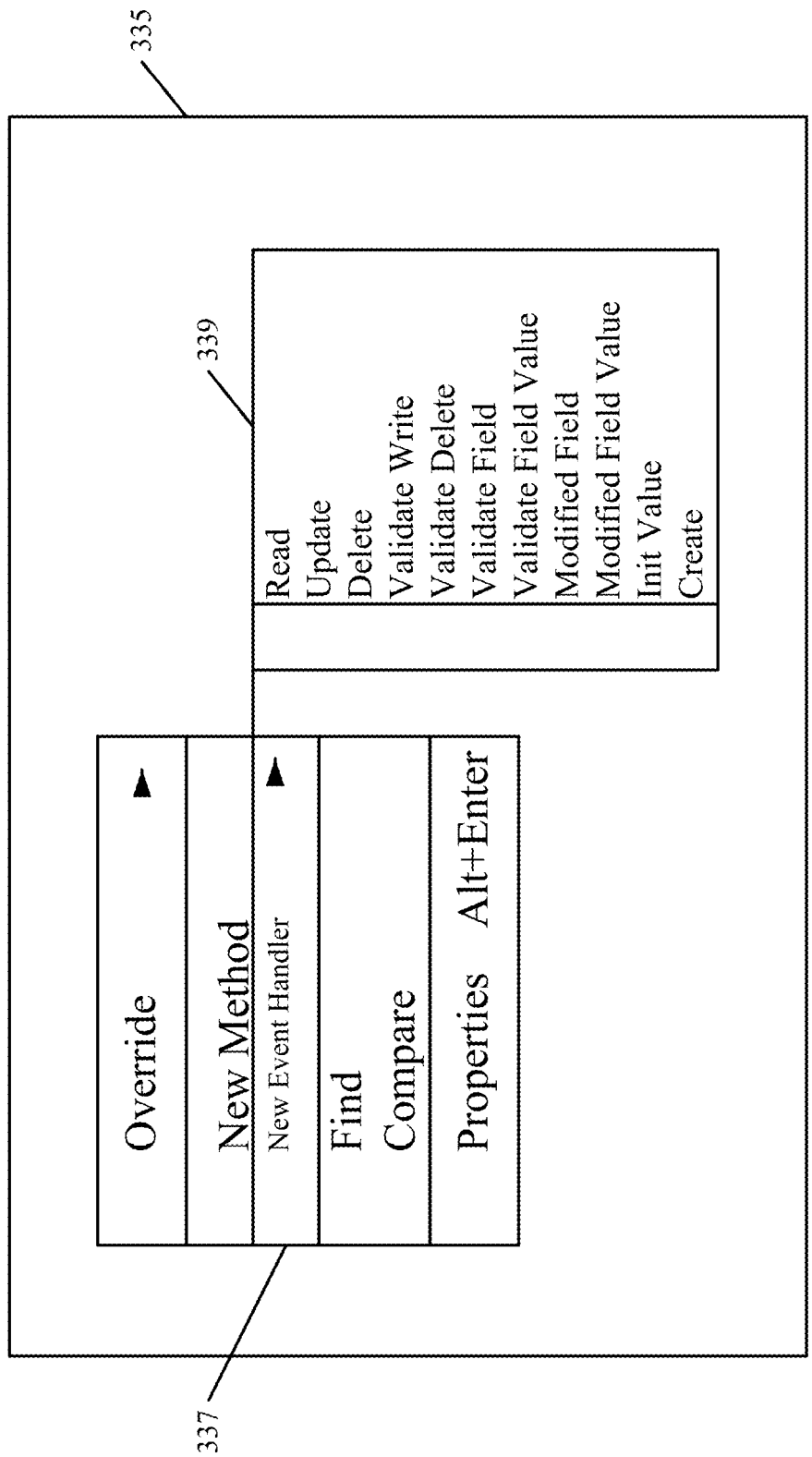

FIG. 6F shows one embodiment where the developer is customizing code, and not just metadata. In FIG. 6F, the user has selected a node that supports source code extensions. FIG. 6F specifically shows that when editing an extension model element (e.g., a table, a form, or any other type) that supports source code extension, the user can illustratively add an event handler method to handle the various framework events exposed by the element type. By way of example, if the user clicks (or right clicks) on a methods node and selects a new event handler, a user interface display, such as display 335 shown in FIG. 6F is generated. It can be seen that, once the user selects the new event handler using user input mechanisms 337, a menu 339 of available event handlers can be displayed. The available event handlers are illustratively those that are available on the particular type that developer 126 is currently editing. When the user selects a desired event handler, the event handler method is added to the code behind the current element. The event handler method can be decorated with the appropriate attributes needed to subscribe to the desired event. It will be noted that the events shown in menu 339 are illustrative only.

As developer 126 makes customizations, visualization component 137 illustratively updates the integrated view 139 to show all of the current customizations, as described above. This is indicated by block 341 in the flow diagram of FIG. 6A.

It can thus be seen that visualization component 137 is an integrated visualization component that generates an integrated view which allows developer 126 to extend metadata or code associated with a selected model element. Developer 126 can edit a current document (such as a current extension model reflecting current customizations), but at the same time, developer 126 can view information (e.g., metadata) from a plurality of closely related documents (such as metadata representing the base model element and all customizations and extensions to that base model element) in an integrated fashion as if they came from the same source. The integrated view 139 illustratively includes visual cues indicating the types of customizations and what document (e.g., what extension model or base model) the customizations belong to.

Figure 7:
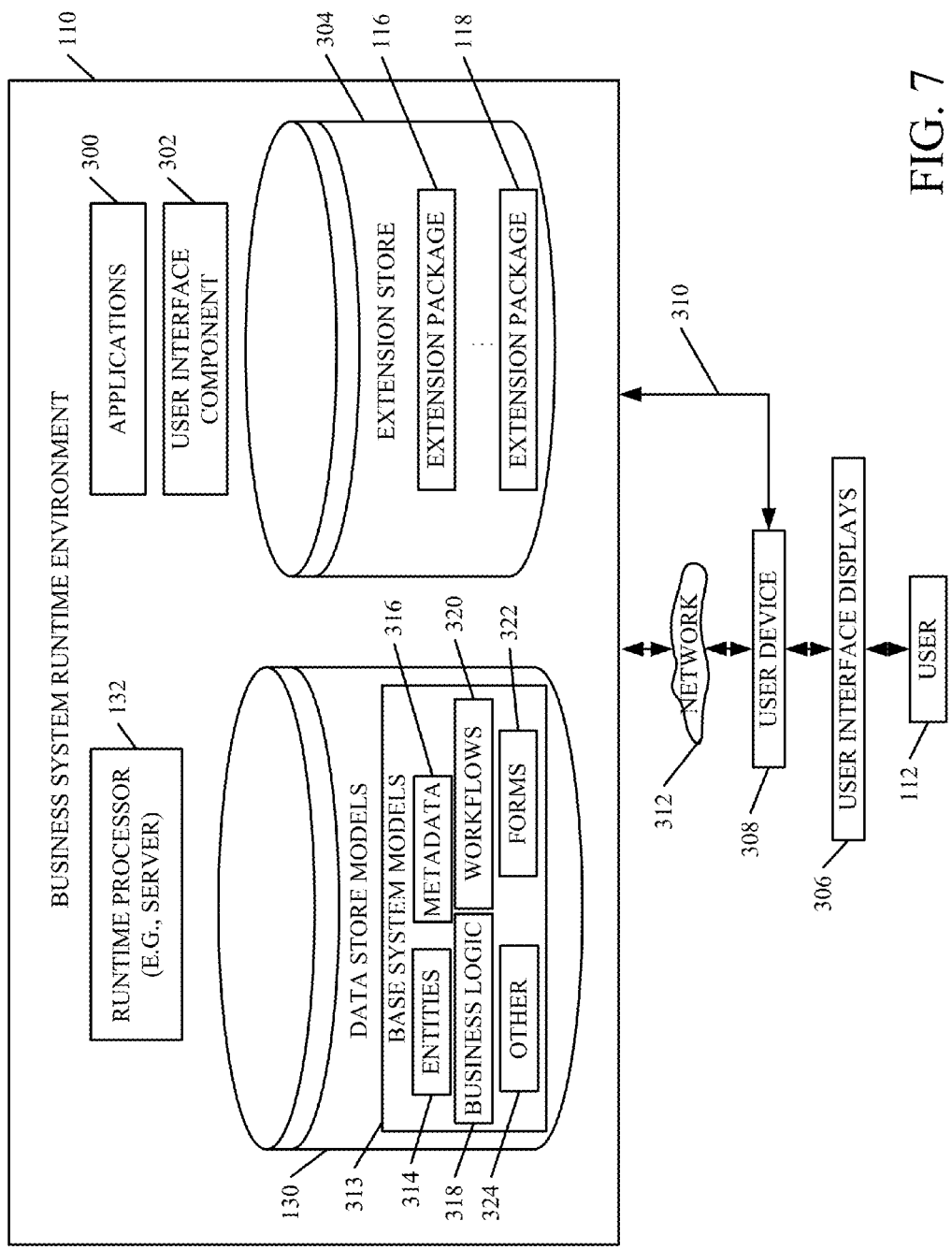
FIG. 7 shows one embodiment of a runtime environment in more detail.

FIG. 7 shows a more detailed block diagram of one runtime environment 110 for the business system (the base business system 114 and its customizations). It can be seen that runtime environment 110 illustratively includes runtime processor (or server) 132 as well as data store 130. The runtime environment 110 can also illustratively include applications 300, a user interface component 302, and an extension data store 304. The runtime environment 110 is shown as being accessible by user 112 through a set of user interface displays 306 generated by a user device 308. User 112 can access environment 110 (through user device 308) either directly, as indicated by arrow 310, or over a network 312. In one embodiment, network 312 is a wide area network, a local area network, or another type of network.

Data store 130 is shown as storing business data, along with business logic and workflows. The data can be stored as entities 314, and metadata 316. Data store 130 also includes business logic 318, workflows 320, forms 322, and a variety of other information 324. Data store 130 can be comprised of multiple different data stores, such as a data store that stores business data (e.g., invoices, etc.) and a metadata store that stores metadata (e.g., application metadata like form types, table types, business logic, etc.).

Entities 314 illustratively represent individual items within the business system. For example, a customer entity represents a customer. A sales quote entity represents a sales quote, an expense entity represents an expense. These are only a few examples and many others can be used as well. The metadata 316 illustratively describes the data and how it is related to, and interacts with, other portions of the business system. Business logic 318 illustratively performs logical operations on data within the business system, and workflows 320 illustratively allow user 112 to interact with user interface displays to perform activities, actions, tasks, etc. in order to conduct the business of the organization that is deploying the business system. As mentioned above, forms 322 illustratively represent user interface displays with user input mechanisms that can be displayed for user interaction by user 112. Runtime processor (or server) 132 illustratively runs applications 300 that access data in data store 130. Applications 300 can be a wide variety of different types of business applications that can be used to conduct the business of the organization deploying the business system. For instance, applications 300 can include a general ledger application, an inventory tracking application, various sales quote and sales order applications, and a variety of other applications that help to automate the tasks performed by user 112 in order to conduct the business of the organization. User interface component 302 illustratively generates user interface displays with user input mechanisms so that user 112 can interact with the business system.

FIG. 7 also shows that, in the runtime environment, extension store 304 is used to store extension packages 116, 118, etc. It will be noted that, in FIG. 7, extension store 304 is shown as a completely separate data store from business data store 130. It will be appreciated, however, that the two data stores can be combined into a single data store, with extension packages 116 and 118 simply being stored separately from the base business system 114, within data store 130. In addition, while two data stores 130 and 304 are shown, and they are both shown as being local to business system runtime environment 110, it will be appreciated that multiple different data stores can be used as well. They can all be local to environment 110, they can all be remote from environment 110 (and accessible by environment 110), or some can be local while others are remote.

User device 308 can be any of a wide variety of different kinds of user devices. It can be a desktop computer, a laptop computer, a tablet, a mobile device (such as a smart phone, a cell phone, etc.). It illustratively includes its own processor and user interface component so that it can generate user interface displays 306 (either on its own or under the direction of user interface component 302). It may also illustratively include a companion application to the business system which resides on the user device. These configurations are mentioned for the sake of example only, and all of them are contemplated herein.

In any case, the base business system models (or corresponding assemblies) 313 are illustratively stored separate from the various extension models (or corresponding assemblies—e.g., extension packages) 116-118, which have been added by developers or other people in the development channel shown in FIG. 1.

Figure 8:
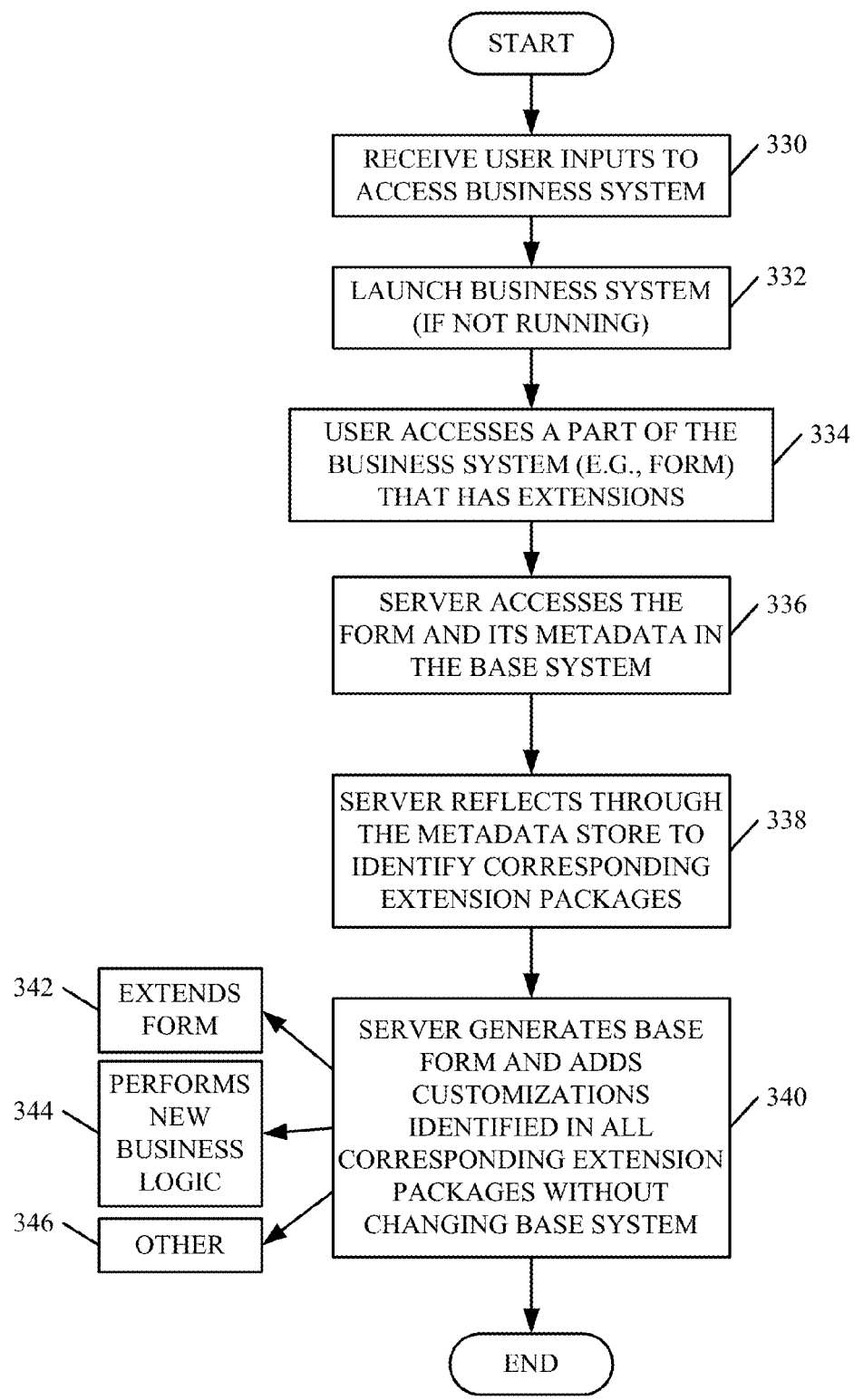
FIG. 8 is a flow diagram illustrating one embodiment of the operation of the runtime environment shown in FIG. 7, in more detail.

FIG. 8 is a flow diagram illustrating one embodiment of the operation of the runtime environment 110 shown in FIG. 7. FIGS. 7 and 8 will now be described in conjunction with one another.

User 112 first logs on to the business system, or otherwise provides inputs through suitable user interface displays 306 that allow user 112 to access the business system, or to launch the business system (if it is not already running) By way of example, user 112 may provide authentication information (such as a username and password) to sign on to the business system. Receiving user inputs to allow user 112 to access the business system as indicated by block 330 in FIG. 8. If the business system is not already running, it is launched. This is indicated by block 332.

User 112 can then interact with various user interface displays 306 that are generated by the business system runtime environment 110 in order to control and manipulate the business system. At some point, user 112 may access a part of the business system (such as a form) that has corresponding extensions. Having the user access this part of the business system is indicated by block 334 in FIG. 8.

In response to those inputs, runtime processor (e.g., server) 132 accesses that part of the business system in the base business systems and determines whether there are corresponding extension packages. For the sake of the present discussion, it will be assumed that the user has accessed a form with extension packages. However, it will be appreciated that the user could access other parts of the business system that have corresponding extension packages and the discussion of accessing a form with extension packages is provided for the sake of example only. In any case, the server accesses the given form 322 and its corresponding metadata 316 in the base business system models (or assemblies) 313. This is indicated by block 336 in FIG. 8.

Server 132 then reflects through the metadata store (and, for example, extension store 304) to identify any extension packages that correspond to the form that is being accessed by user 112. This is indicated by block 338 in FIG. 8. In one embodiment, server 132 can determine whether any extension packages exist by reflecting through the metadata corresponding to the accessed form. In another embodiment, server 132 reflects through a given memory location (such as extension store 304) only, to identify extension packages that correspond to the form being accessed. The server can reflect through the data store in other ways, or identify corresponding extension packages in other ways as well.

Once the server has located extension packages 116-118, which correspond to the form being accessed, server 132 executes the base assemblies and the separate extension assemblies to generate the base form and to add customizations that have been identified in all corresponding extension packages, without any alterations to the base system 114 (that is, the base models or base assemblies). This is indicated by block 340 in FIG. 8. For example, server 132 can modify the base form to include the additions and extensions to fields, etc. This is indicated by block 342 in FIG. 8. Server 132 can also perform new business logic corresponding to the form. This is indicated by block 344. Server 132 can perform other customizations or extensions to the form as well, and this is indicated by block 346.

It can thus be seen that customizations and extensions can be made to a base business system, without overwriting or otherwise altering the base business system. The extensions are generated and stored in a way that makes them easy to discover by a runtime server. The runtime server identifies extensions to parts of the business system that are being accessed by a user, and applies those extensions, without ever modifying the base business system. This assists in making updates, bug fixes and other maintenance, to the base business system and to the customizations without creating conflicts.

The above discussion has referred to processors and servers. It will be noted these illustratively comprise computer processors with associated memory and time circuitry (which may not be separately shown). The processors and servers comprise a functional part of the system, device or component in which they are included. They are activated by the other components, services, or items and facilitate their functionality.

A number of exemplary user interface displays have also been shown. It will be appreciated, however, that the user interface displays can be generated in a wide variety of different locations, and they can include a wide variety of different user input mechanisms. Those user input mechanisms can include, for example, text boxes, check boxes, buttons, icons, tiles, links, drop down menus, etc. In addition, the user input mechanisms can be actuated in a wide variety of different ways. They can be actuated using a point and click device (such as a mouse or track ball), using a keypad, a keyboard, a joystick, buttons, actuators, etc. Further, they can be actuated using a virtual keypad or keyboard, virtual buttons, or other virtual elements. Where the device on which the user interface displays are displayed is a touch sensitive screen, the user input mechanisms can also be actuated using touch gestures. Further, where the device used to display the user interface displays has associated speech recognition or retinal tracking components, the user input mechanisms can be actuated using voice or retinal tracking.

It will also be appreciated that the drawings shown herein include boxes with certain functionality or components ascribed to them. It will be noted that the functionality can be divided in different ways as well so that more boxes or fewer boxes are included to perform the same functionality.

Figure 9:
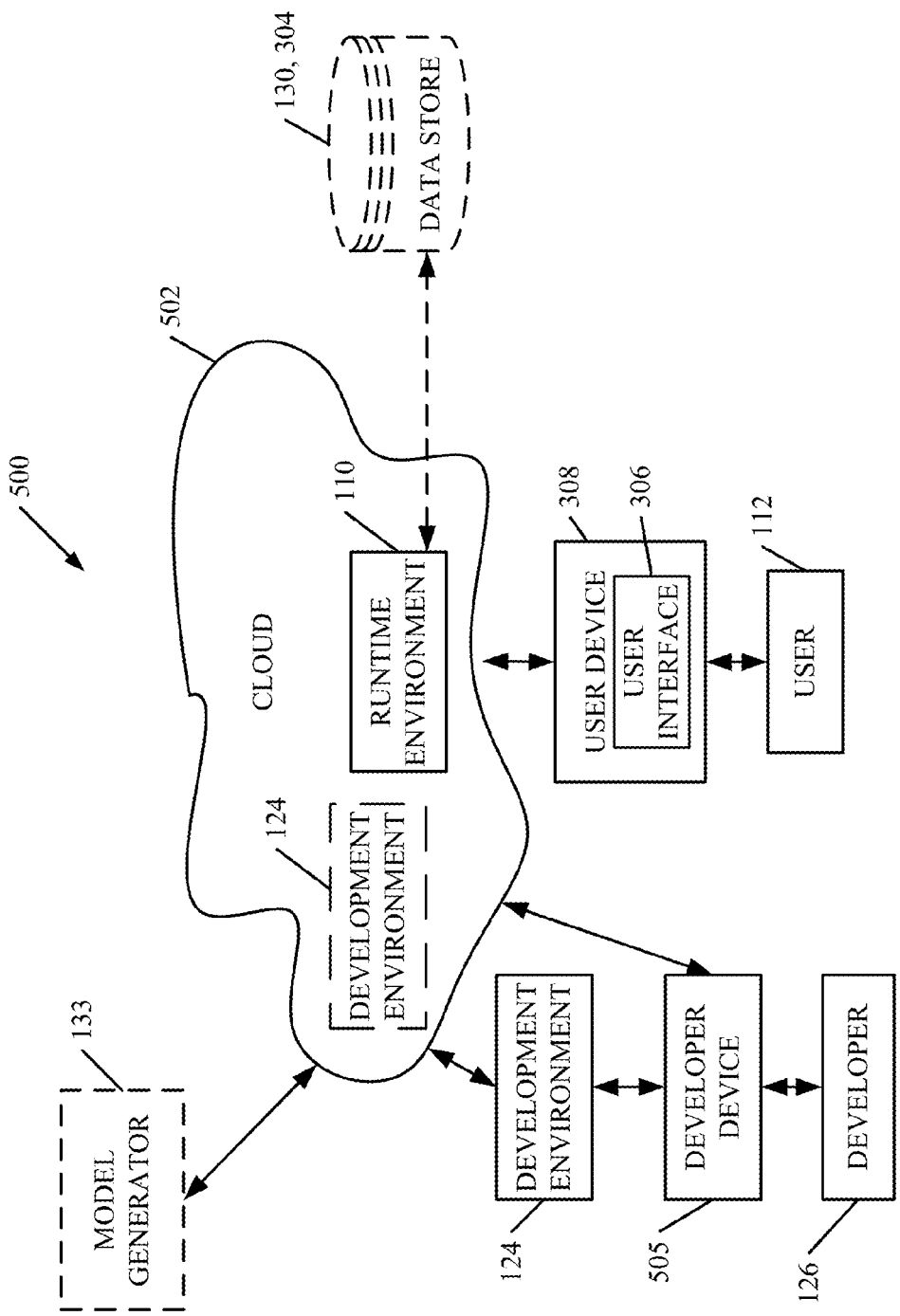
FIG. 9 is a block diagram of the architecture shown in FIG. 2, deployed in a cloud computing architecture.

FIG. 9 is a block diagram of architecture 122, shown in FIG. 2, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 122 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 9, some items are similar to those shown in FIG. 2 and they are similarly numbered. FIG. 9 specifically shows that both development environment 124 and runtime environment 110 can optionally be located in cloud 502 (which can be public, private, or a combination where portions are public while others are private). They can be disposed outside cloud 502 as well, as indicated with development environment 124. Therefore, user 112 uses a user device 308 to access those environments through cloud 502. Developer 126 can use a developer device 505 to access the environments through cloud 502.

FIG. 9 also depicts another embodiment of a cloud architecture. FIG. 9 shows that it is also contemplated that some elements of environments 110 and 124 are disposed in cloud 502 while others are not. By way of example, data stores 130, 304 can be disposed outside of cloud 502, and accessed through cloud 502. In another embodiment, model generator 133 and is also outside of cloud 502. Regardless of where they are located, they can be accessed directly by device 308, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 122, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
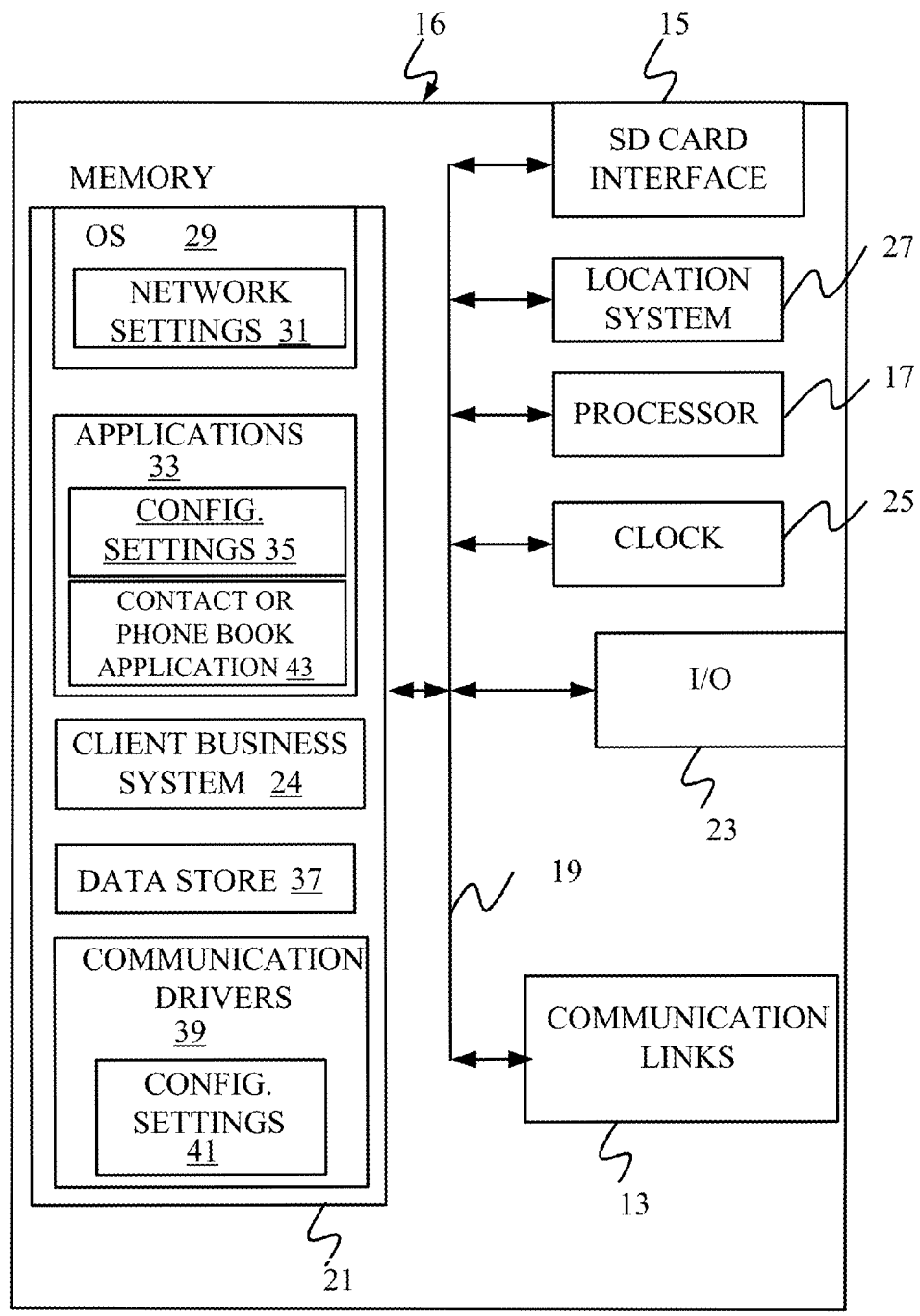
FIGS. 10-15 show embodiments of mobile devices.

FIG. 10 is a simplified block diagram of one illustrative embodiment of a handheld or mobile computing device that can be used as a user's or client's hand held device 16, in which the present system (or parts of it) can be deployed, or which can be used by a user or developer to access the various environments described herein. FIGS. 11-14 are examples of handheld or mobile devices.

FIG. 10 provides a general block diagram of the components of a client device 16 that can run components of architecture 122 or that interacts with architecture 122, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 129, 132) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of architecture 122. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 11:
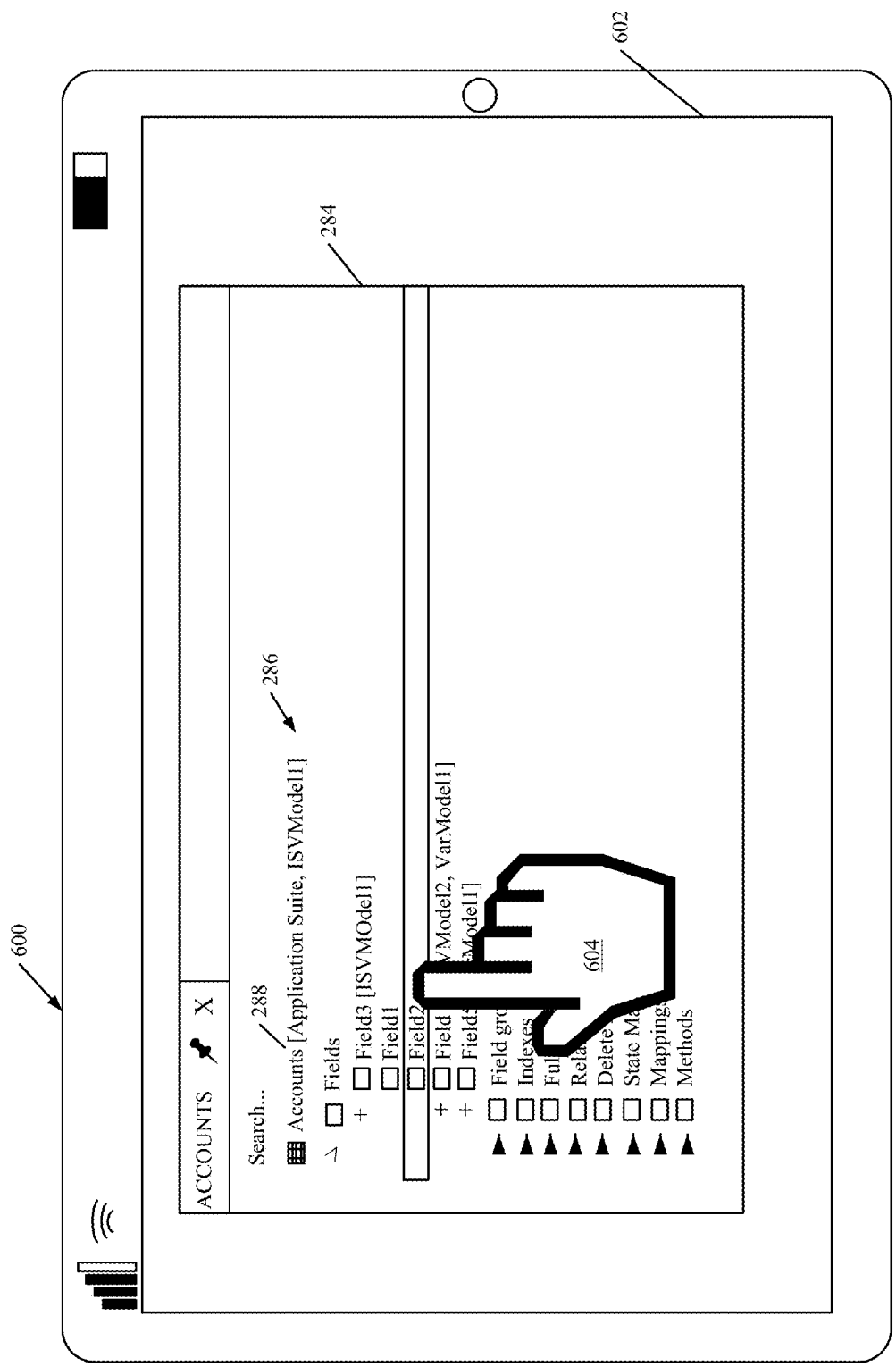

FIG. 11 shows one embodiment in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 12:
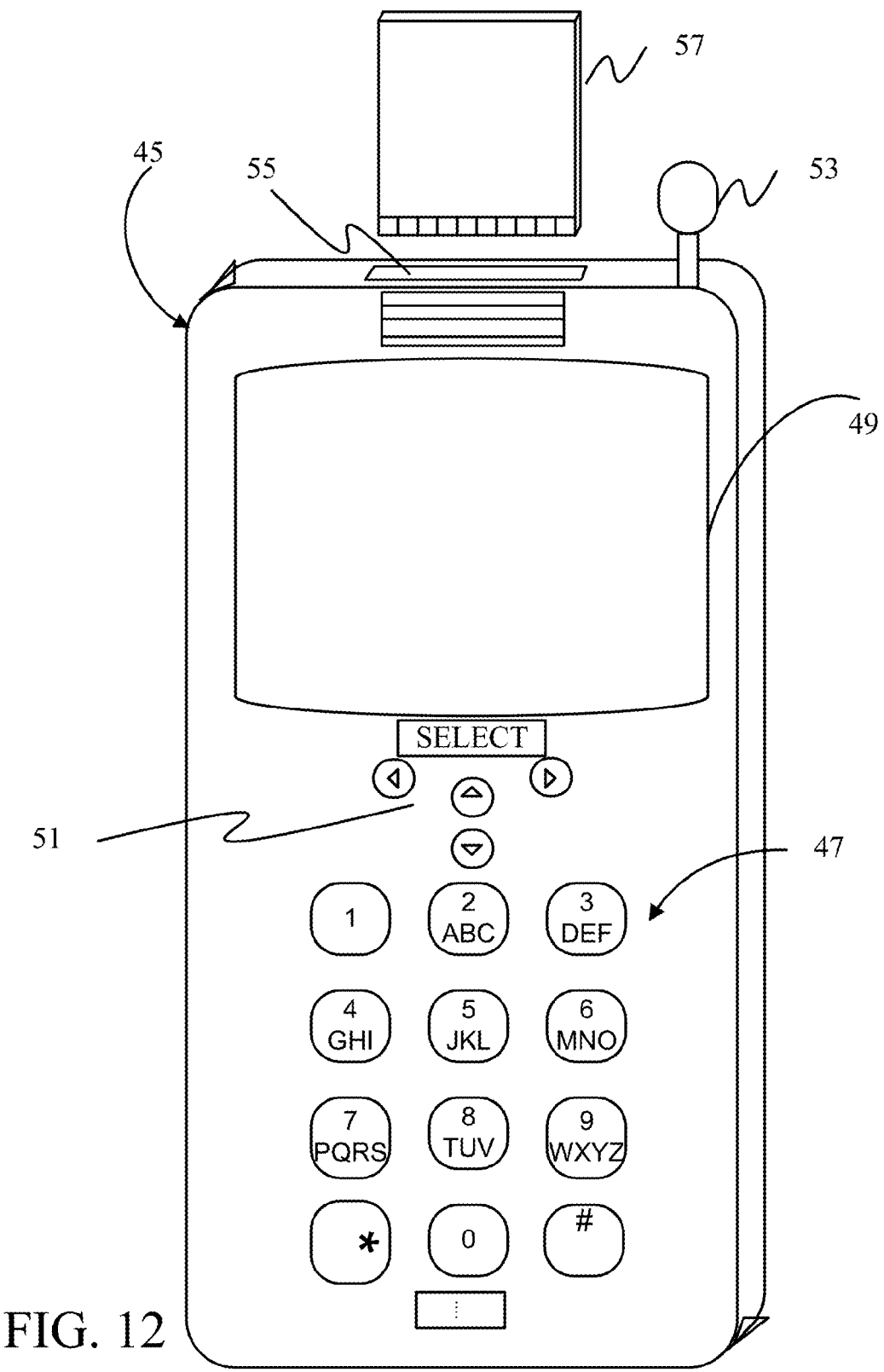
Figure 13:
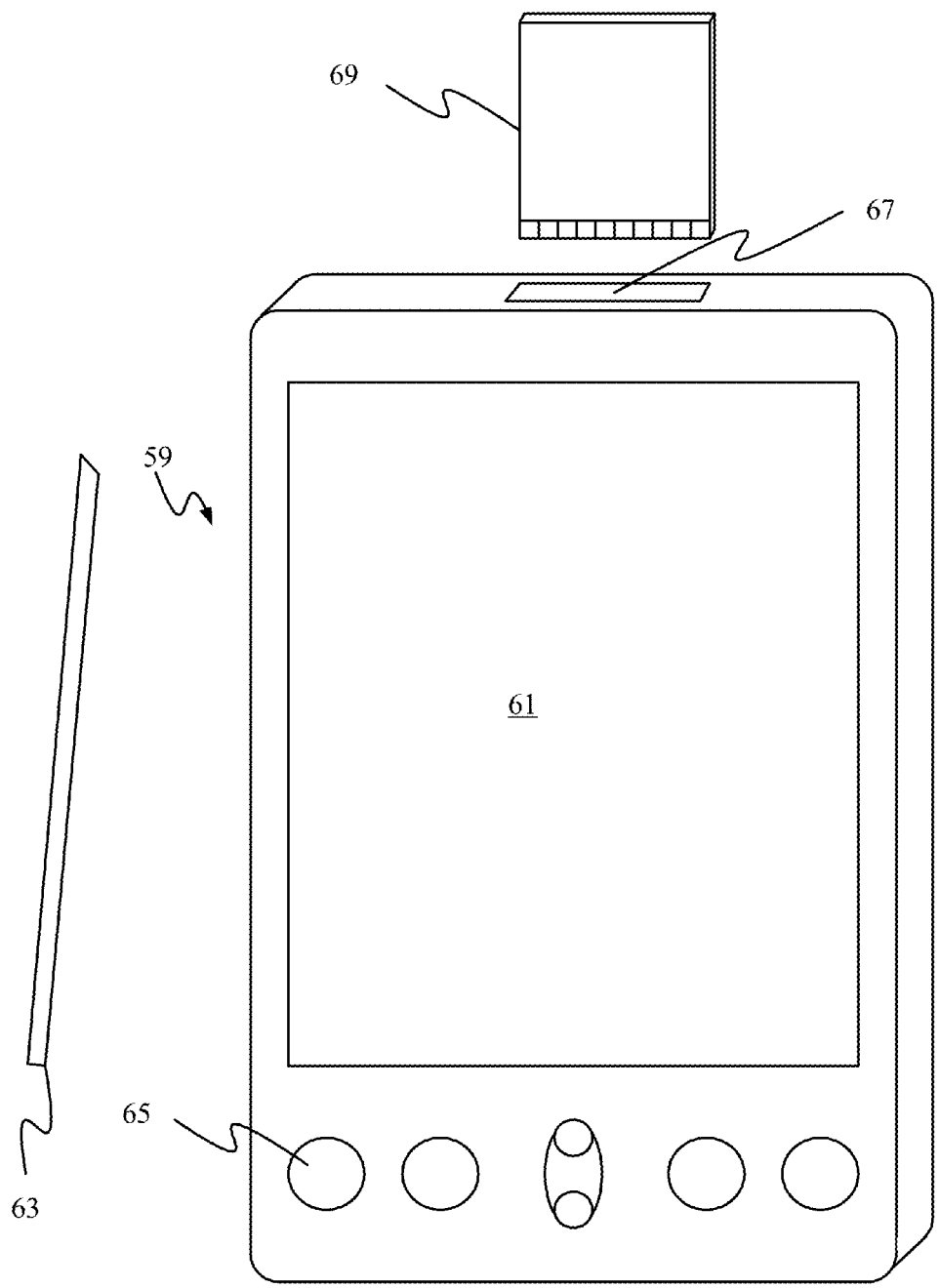

FIGS. 12 and 13 provide additional examples of devices 16 that can be used, although others can be used as well. In FIG. 12, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 13 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 14:
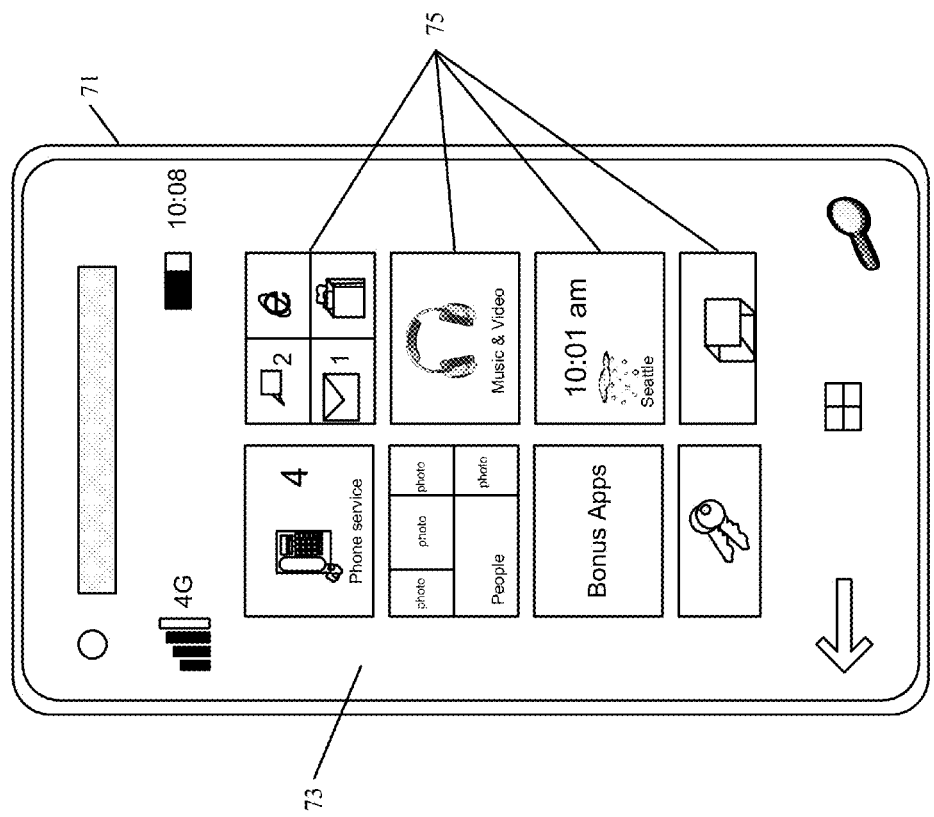

FIG. 14 is similar to FIG. 12 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
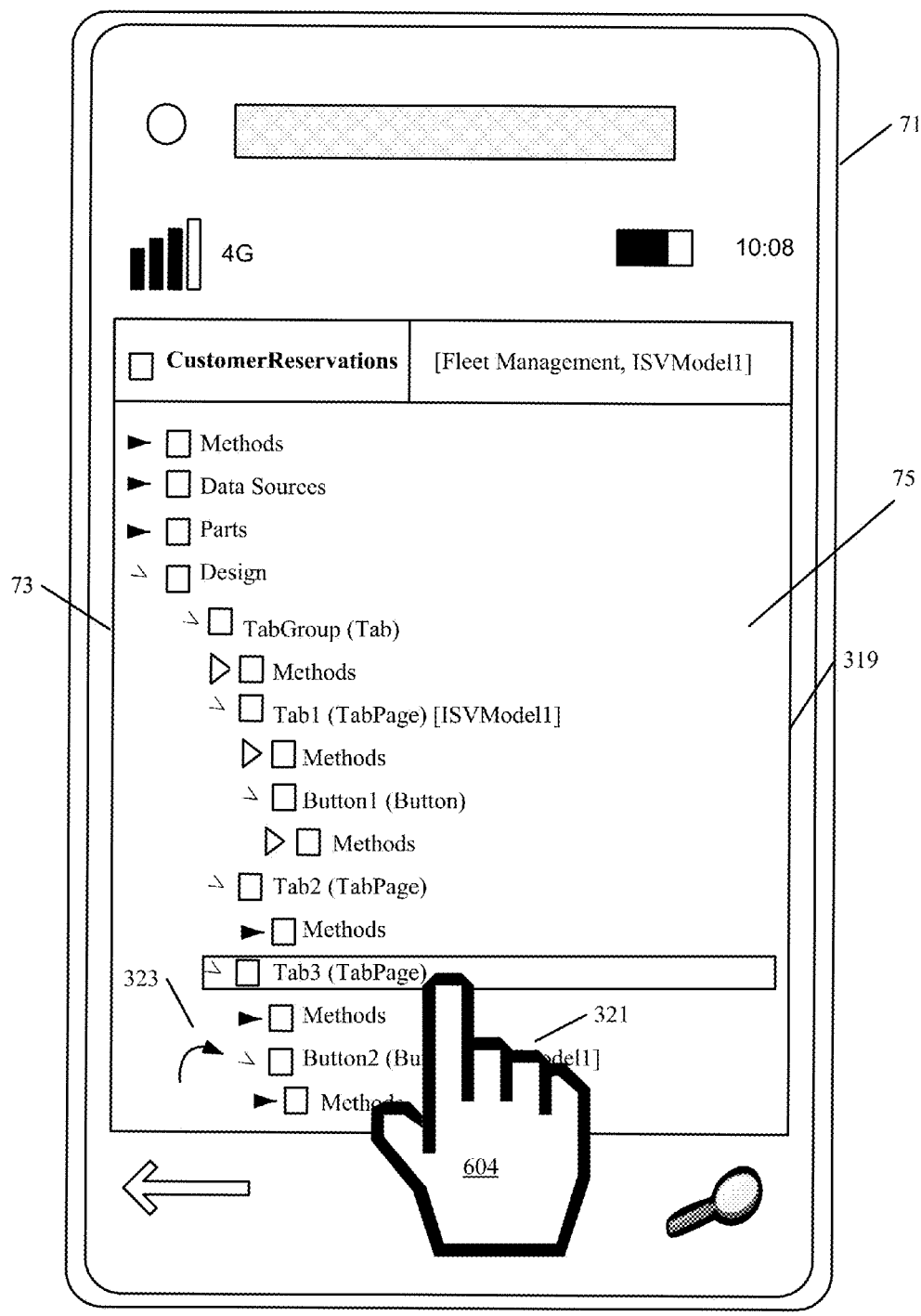
Figure 16:
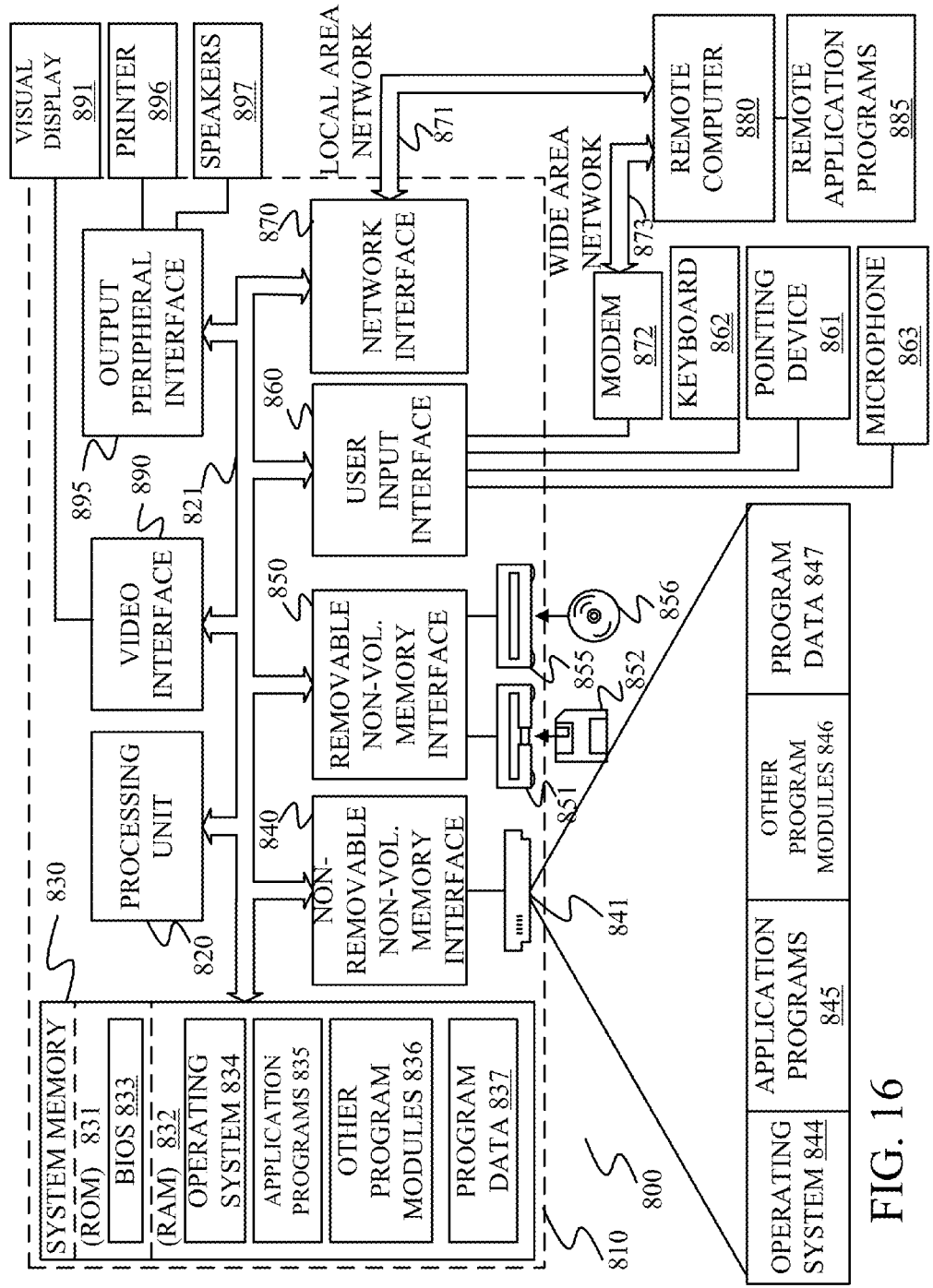
FIG. 16 is a block diagram of one embodiment of a computing environment.

FIG. 15 is one embodiment of a computing environment in which architecture 122, or parts of it, (for example) can be deployed. With reference to FIG. 15, an exemplary system for implementing some embodiments includes a general-purpose computing device in the form of a computer 810. Components of computer 810 may include, but are not limited to, a processing unit 820 (which can comprise processor 129 or 132), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 15 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of visualizing customizations to a computer system having types modeled with model elements, comprising:

receiving an indication of a user selection input, at a development and customization system, indicative of a selected model element to be visualized as a current extension model, the current extension model modeling customizations of the selected model element from a base model; and instructing a display device to display an integrated view of the selected model element that visually identifies the base model corresponding to the selected model element and visually identifies customizations to the selected model element made in the current extension model, separately from the base model, the current extension model being customizable from the integrated view and the base model being viewable from the integrated view, the integrated view including a hierarchical tree view having parent and child nodes indicative of items in the selected model element, each node having a visual model indication indicating a model to which it belongs, the integrated view identifying other customizations to the selected model element, other than those modeled in the current extension model, as belonging to other extension models, by identifying the other customizations separately from the base model and separately from the customizations in the current extension model, and by displaying a visual customization model indication identifying a model in which each node in the hierarchical tree view has been customized.

2. The computer-implemented method of claim 1 wherein instructing the display device to display the integrated view comprises:
instructing the display device to display a visual re-ordering indication identifying that a given node in the hierarchical tree view has been customized to be re-ordered relative to other nodes in the hierarchical tree view.

3. The computer-implemented method of claim 1 wherein instructing display device to display the integrated view comprises:
instructing the display device to display a visual re-parenting indication identifying that a given node in the hierarchical tree view has been customized to be re-ordered to have a different parent node in the hierarchical tree view.

4. The computer-implemented method of claim 1 wherein instructing the display device to display the integrated view comprises:
instructing the display device to display the integrated view with user input mechanisms so that user interaction to customize the selected model element in its corresponding extension model is the same across other extension models and model elements in the other extension models as well as user interaction with a base model to customize the base model element in the base model.

5. The computer-implemented method of claim 1 wherein the customizations are reflected in a hierarchy of models, and wherein instructing the display device to display the integrated view comprises:
instructing the display device to display nodes in the hierarchical tree view as customizable if they are in the current extension model or in a higher layer of models in the hierarchy of models than the current extension model.

6. The computer-implemented method of claim 1 and further comprising:
receiving an indication of user inputs indicative of whether the user is to customize a model element within an existing project or in a new project.

7. The computer-implemented method of 1 wherein receiving an indication of a user selection input comprises:
receiving an indication of the user selection input to select a model element comprising one of a table, a form, a menu, an enumeration, a method, and other model elements.

8. A development system, comprising:
a model generator that receives indications of user model inputs and generates a first model that models a type in a computer system, the first model including first model elements, the model generator receiving indications of model customization inputs and generating a customization model that models customizations to the first model elements;
a visualization component that receives an indication of a user element selection that selects a model element, from the first model elements, to be visualized, the visualization component instructing a display device to display an integrated view of the selected model element that identifies the first model and that also visually indicates customizations to the selected model element made in the generated customization model, separately from the first model, the generated customization model being customizable from the integrated view and the first model being viewable from the integrated view, wherein the integrated view includes a hierarchical tree view having parent and child nodes indicative of items in the selected model element, each node having a visual model indication indicating a model to which it belongs, the integrated view identifying other customizations to the selected model element made in one or more other customization models, other than the generated customization model by identifying the other customizations separately from the first model and separately from the customizations in the generated customization model, wherein the integrated view includes a visual customization model indication identifying a model in which each node in the hierarchical tree view has been customized; and
a computer processor that is a functional part of the development system and that is activated by the model generator and the visualization component to facilitate model generation and instructing the display device to display the integrated view of the selected model.

9. The development system of claim 8 wherein the visualization component instructs the display device to display the integrated view to identify which parts of the selected model element are modeled by which of the other customization models.

10. The development system of claim 9 wherein the visualization component instructs the display device to display the integrated view so that parts of the selected model element that are modeled by the customization model are customizable by the model generator from the integrated view and so that parts of the selected model element customized in the other customization models are read only in the integrated view.

11. The development system of claim 10 wherein the visualization component instructs the display device to display the integrated view so that parts of the selected model element that are modeled by the first model are read only in the integrated view.

12. The development system of claim 8 wherein the hierarchical tree view displays parent nodes and child nodes, a given child node being dependent on a given parent node, the hierarchical view identifying which nodes are modeled by the first model, which nodes are modeled by the customization model and which nodes are modeled by the other customization models.

13. The development system of claim 12 wherein the visualization component instructs the display device to display a visual re-ordering indication adjacent nodes that have been re-ordered in the hierarchical tree view.

14. The development system of claim 8 wherein the computer system comprises a business system.

15. A computer readable storage medium that stores computer executable instructions which, when executed by a computer, cause the computer to perform a method, comprising:
receiving an indication of a user selection input indicative of a selected model element to be visualized as a current extension model; and
instructing a display device to display an integrated view of the selected model element that identifies a base model corresponding to the selected model element and identifies customizations in the current extension model, separately from the base model, the current extension model being customizable from the integrated view and the base model being viewable from the integrated view, the integrated view including a hierarchical tree view having parent and child nodes indicative of items in the selected model element, each node having a visual model indication indicating a model to which it belongs, the integrated view identifying all other customizations to the selected model element, other than those modeled in the current extension model, as belonging to other extension models, by identifying all the other customizations separately from the base model and separately from the customizations in the current extension model, and by displaying a visual customization model indication identifying a model in which each node in the hierarchical tree view has been customized.

16. The computer readable storage medium of claim 15 wherein instructing the display device to display the integrated view comprises:

instructing the display device to display parts of the selected model element that are modeled by the current extension model as being customizable and displaying parts of the selected model element modeled by the base model as being read only.

17. The computer readable storage medium of claim 15, wherein the integrated view is displayed so that parts of the selected model element that are modeled by the current extension model are customizable from the integrated view and so that parts of the selected model element customized in the other extension models are read only in the integrated view.

* * * * *